United States Patent
Kawahara

(10) Patent No.: US 8,035,695 B2
(45) Date of Patent: Oct. 11, 2011

(54) IMAGE SENSING APPARATUS, METHOD OF CONTROLLING IMAGE SENSING APPARATUS AND IMAGE RECORDING APPARATUS, AND METHOD OF DESIGNING OPTICAL SYSTEM

(75) Inventor: Hideo Kawahara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 12/429,770

(22) Filed: Apr. 24, 2009

(65) Prior Publication Data

US 2009/0268061 A1 Oct. 29, 2009

Related U.S. Application Data

(62) Division of application No. 11/299,668, filed on Dec. 13, 2005, now Pat. No. 7,535,500, which is a division of application No. 09/663,543, filed on Sep. 15, 2000, now Pat. No. 6,987,532.

(30) Foreign Application Priority Data

Sep. 20, 1999 (JP) .................................. 11-265779

(51) Int. Cl.
*H04N 5/225* (2006.01)
*H04N 5/262* (2006.01)
*G03B 17/00* (2006.01)
(52) U.S. Cl. ................... 348/220.1; 348/335; 348/240.3; 396/72
(58) Field of Classification Search ............ 348/220.1, 348/208.1, 223.1, 224.1, 221.1, 207.99, 345, 348/347, 231.99
See application file for complete search history.

(56) References Cited

U.S. PATENT DOCUMENTS

| | | | |
|---|---|---|---|
| 5,357,298 A | | 10/1994 | Imai et al. |
| 5,703,638 A | | 12/1997 | Ohta et al. |
| 5,835,143 A | * | 11/1998 | Kakiuchi ................. 348/349 |
| 5,875,359 A | | 2/1999 | Ohtake et al. |
| 6,348,940 B1 | | 2/2002 | Sano et al. |

(Continued)

FOREIGN PATENT DOCUMENTS

JP 02-039777 A 2/1990

(Continued)

OTHER PUBLICATIONS

The above references were cited in a Nov. 10, 2009 Japanese Office Action that issued in Japanese Patent Application No. 2000-285459, which is enclosed without English Translation. Please note that the Japanese Patent Application No. 2000-285459 claims domestic priority of the basic Japanese Patent application.

*Primary Examiner* — Lin Ye
*Assistant Examiner* — Mekonnen Dagnew
(74) *Attorney, Agent, or Firm* — Cowan, Liebowltz & Latman, P.C.

(57) ABSTRACT

An image sensing apparatus which has an optical system, the focal length of which is variable, and an image sensing element that converts an image formed by the optical system into an electrical signal, and can sense and record a moving image and still image, includes a focal length detection circuit for detecting the focal length of the optical system, and a control unit for inhibiting recording of the still image in accordance with the focal length detected by the focal length detection circuit.

8 Claims, 18 Drawing Sheets

U.S. PATENT DOCUMENTS

| | | |
|---|---|---|
| 6,466,264 B1 | 10/2002 | Shioji |
| 6,493,027 B2 | 12/2002 | Ohta et al. |
| 6,788,345 B1 | 9/2004 | Okamura |
| 6,798,447 B1 * | 9/2004 | Katsuki .................... 348/208.12 |
| 6,819,357 B1 | 11/2004 | Miyadera |
| 2001/0040626 A1 * | 11/2001 | Ohta et al. .................... 348/220 |
| 2001/0050712 A1 | 12/2001 | Dunton et al. |
| 2003/0031469 A1 | 2/2003 | Hirai |

FOREIGN PATENT DOCUMENTS

| | | |
|---|---|---|
| JP | 03-076384 A | 4/1991 |
| JP | 05-107612 A | 4/1993 |

* cited by examiner

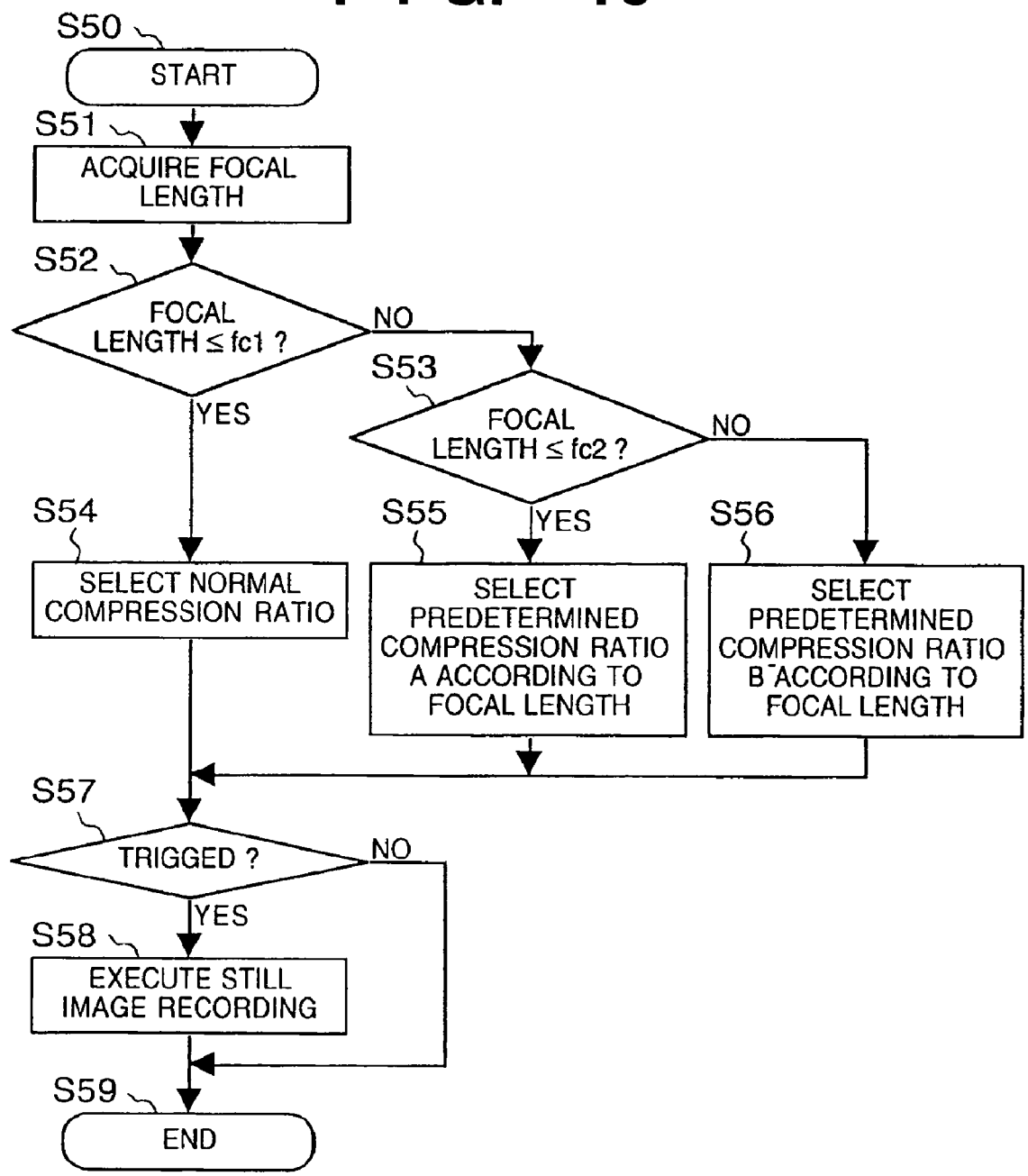

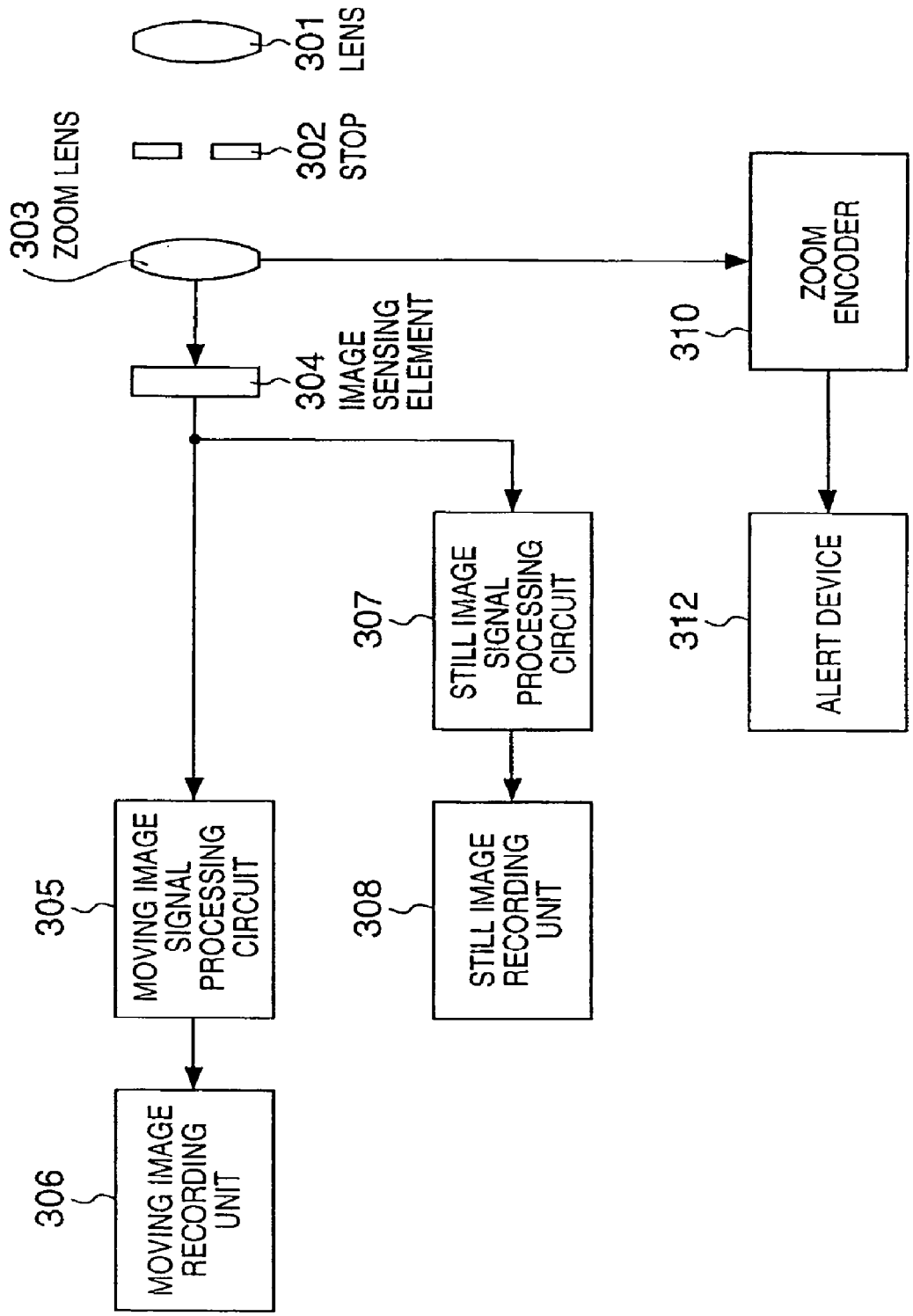

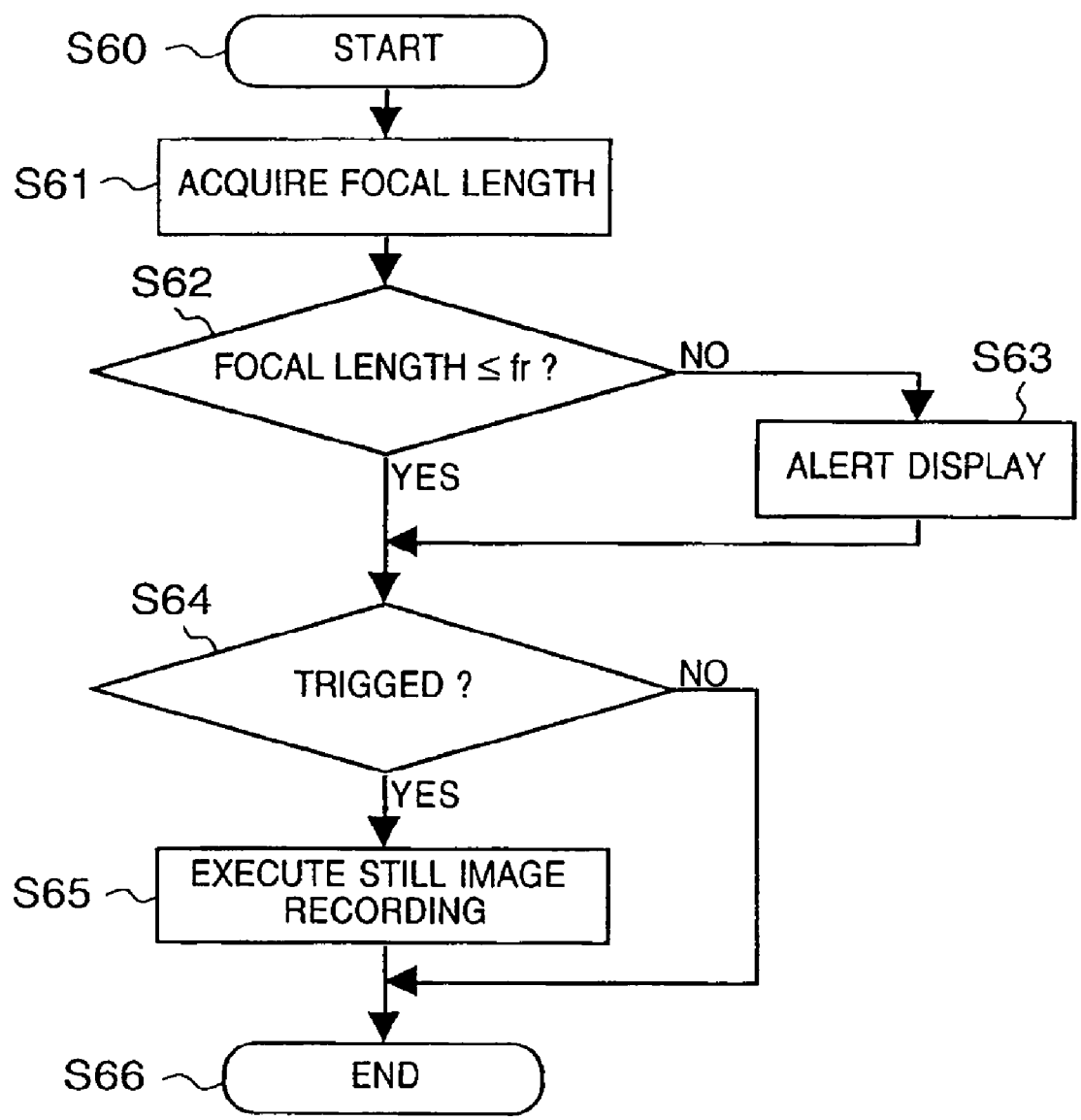

ible with increasing variable focal length ratio (zoom ratio).

IMAGE SENSING APPARATUS, METHOD OF CONTROLLING IMAGE SENSING APPARATUS AND IMAGE RECORDING APPARATUS, AND METHOD OF DESIGNING OPTICAL SYSTEM

CROSS-REFERENCE TO RELATED APPLICATIONS

This application is a divisional of application Ser. No. 11/299,668, filed Dec. 13, 2005 now U.S. Pat. No. 7,535,500; which is a divisional of application Ser. No. 09/663,543, filed Sep. 15, 2000, now U.S. Pat. No. 6,987,532, the entire disclosure of which is hereby incorporated by reference.

FIELD OF THE INVENTION

The present invention relates to an image sensing apparatus, method of controlling an image sensing apparatus and an image recording apparatus, and a method of designing an optical system used and, more particularly, to an image sensing apparatus, method of controlling an image sensing apparatus and an image recording apparatus, and a method of designing an optical system when a multi-pixel image sensing element is used.

BACKGROUND OF THE INVENTION

Conventionally, image sensing apparatuses which can record both still image and moving images have been proposed. For example, and image sensing apparatus that integrates a video camera and tape recorder, and can record a moving image and still image on a single tape, and an image sensing apparatus which records a moving image on a tape and records a still image on another recording medium such as memory, are known.

In recent image sensing apparatuses, an image sensing element has a larger number of pixels. However, an optical system including lenses becomes larger with increasing number of pixels of the image sensing element. Such increase in size of the optical system is to achieve an optical resolution corresponding to the increase in the number of pixels, and even when the size of the image sensing area (image size) of the image sensing element remains the same, an optical system must be designed so as to correspond to such multi-pixels. Especially, in still image sensing, an image sensing element which has a high pixel density approaching a silver halide camera has been put into practical applications, and an image sensing apparatus that can record both still and moving images described in the prior art is beginning to adopt such multi-pixel image sensing element.

However, moving images still use the video format such as NTSC that complies with an existing moving image sensing scheme, and such image need not be recorded at such high resolution that exhibits the resolving power of the multi-pixel image sensing element.

Therefore, upon examining an image sensing apparatus which uses a multi-pixel image sensing element and can record both still and moving images, such system can improve the resolution of a still image compared to the conventional image sensing apparatuses, but has a bulky optical system, and has a resolution of a moving image as low as the conventional apparatus.

Furthermore, in a so-called zoom lens as an optical system that can vary the focal length, the size of the optical system increases conspicuously, and such tendency is considerable with increasing variable focal length ratio (zoom ratio).

SUMMARY OF THE INVENTION

The present invention has been made in consideration of the above situation, and has as its object to provide an image sensing apparatus which assures good balance between the size of an optical system and image quality in correspondence with conditions such as the use purpose of the image sensing apparatus, the required resolution of a sensed image, the size of the image sensing apparatus, and the like, an image sensing method, and a method of designing an optical system used in the image sensing apparatus.

According to the present invention, the foregoing object is attained by providing an image sensing apparatus comprising an image sensing element that converts an optical image of an object passed through an optical transparent member to an image signal, and an image processing device that performs moving image signal processing for processing the image signal converted by the image sensing element as a moving image signal and still image signal processing for processing the image signal as a still image signal, wherein, when the still image signal processing is to be executed, the signal processing device performs predetermined control in response to movement of the optical transparent member to a predetermined position, the predetermined control being not performed when the moving image signal processing is to be executed.

According to the present invention, the foregoing object is also attained by providing an image sensing apparatus comprising an image sensing element that converts an optical image of an object passed through an optical transparent member to an image signal, and an image processing device that performs first signal processing for obtaining an image signal of a first resolution from the image signal converted by the image sensing element and second signal processing for obtaining an image signal of a second resolution which is higher than the first resolution from the image signal, wherein, when the second signal processing is to be executed, the signal processing device performs predetermined control in response to movement of the optical transparent member to a predetermined position, the predetermined control being not performed when the first signal processing is to be executed.

Further, according to the present invention, the foregoing object is also attained by providing an image sensing apparatus comprising an image sensing element that converts an optical image of an object passed through an optical transparent member to an image signal, and an image processing device that performs moving image signal processing for processing the image signal converted by the image sensing element as a moving image signal and still image signal processing for processing the image signal as a still image signal, wherein, when the still image signal processing is to be executed, the signal processing device applies predetermined limitation upon movement of the optical transparent member to a predetermined position, the predetermined limitation being not applied when the moving image signal processing is to be executed.

Further, according to the present invention, the foregoing object is also attained by providing an image sensing apparatus comprising an image sensing element that converts an optical image of an object passed through an optical transparent member to an image signal, and an image processing device that performs first signal processing for obtaining an image signal of a first resolution from the image signal converted by the image sensing element and second signal processing for obtaining an image signal of a second resolution which is higher than the first resolution from the image signal, wherein, when the second signal processing is to be executed, the signal processing device applies predetermined limitation upon movement of the optical transparent member to a predetermined position, the predetermined limitation being not applied when the first signal processing is to be executed.

Furthermore, according to the present invention, the foregoing object is also attained by providing an apparatus comprising an image recording device that performs image recording of an optical image of an object passed through an optical transparent member in a first resolution and in a second resolution which is higher than the first resolution, and a control device that performs predetermined control in response to movement of the optical transparent member to a predetermined position when the image recording in the second resolution is to be executed, the predetermined control being not performed when the image recording in the first resolution is to be executed.

Further, according to the present invention, the foregoing object is also attained by providing an apparatus comprising an image recording device that performs image recording of an optical image of an object passed through an optical transparent member in a first resolution and in a second resolution which is higher than the first resolution, and a control device for applying predetermined limitation upon movement of the optical transparent member to a predetermined position when the image recording in the second resolution is to be executed, the predetermined limitation being not applied when the image recording in the first resolution to be executed.

Further, according to the present invention, the foregoing object is also attained by providing a control method of an image sensing apparatus comprising the steps of converting an optical image of an object passed through an optical transparent member to an image signal, and performing moving image signal processing for processing the image signal converted by the image sensing element as a moving image signal and still image signal processing for processing the image signal as a still image signal, wherein, when the still image signal processing is to be executed, predetermined control in response to movement of the optical transparent member to a predetermined position is performed, the predetermined control being not performed when the moving image signal processing is to be executed.

Further, according to the present invention, the foregoing object is also attained by providing a control method of an image sensing apparatus comprising the steps of converting an optical image of an object passed through an optical transparent member to an image signal, and performing first signal processing for obtaining an image signal of a first resolution from the image signal converted by the image sensing element and second signal processing for obtaining an image signal of a second resolution which is higher than the first resolution from the image signal, wherein, when the second signal processing is executed, predetermined control in response to movement of the optical transparent member to a predetermined position is performed, the predetermined control being not performed when the first signal processing is to be executed.

Further, according to the present invention, the foregoing object is also attained by providing a control method of an image sensing apparatus comprising the steps of converting an optical image of an object passed through an optical transparent member to an image signal, and performing moving image signal processing for processing the image signal converted by the image sensing element as a moving image signal and still image signal processing for processing the image signal as a still image signal, wherein, when the still image signal processing is to be executed, predetermined limitation upon movement of the optical transparent member to a predetermined position is applied, the predetermined limitation being not applied when the moving image signal processing is to be executed.

Further, according to the present invention, the foregoing object is also attained by providing a control method of an image sensing apparatus comprising the steps of converting an optical image of an object passed through an optical transparent member to an image signal, and performing first signal processing for obtaining an image signal of a first resolution from the image signal converted by the image sensing element and second signal processing for obtaining an image signal of a second resolution which is higher than the first resolution from the image signal, wherein, when the second signal processing is to be executed, predetermined limitation upon movement of the optical transparent member to a predetermined position is applied, the predetermined limitation being not applied when the first signal processing is to be executed.

Further, according to the present invention, the foregoing object is also attained by providing a control method of an image recording apparatus comprising the steps of performing image recording of an optical image of an object passed through an optical transparent member in a first resolution and in a second resolution which is higher than the first resolution, and performing predetermined control in response to movement of the optical transparent member to a predetermined position when the image recording in the second resolution is to be executed, the predetermined control being not performed in the image recording when the first resolution is to be executed.

Further, according to the present invention, the foregoing object is also attained by providing a control method of an image recording apparatus comprising the steps of performing image recording of an optical image of an object passed through an optical transparent member in a first resolution and in a second resolution which is higher than the first resolution, and applying predetermined limitation upon movement of the optical transparent member to a predetermined position when the image recording in the second resolution is to be executed, the predetermined limitation being not applied in the image recording when the first resolution is to be executed.

Further, according to the present invention, the foregoing object is also attained by providing a method of designing an optical system, which is attached to an image recording apparatus capable of recording a moving image and a still image of an optical image of an object passed through an optical transparent member, wherein optical property of the optical system is designed allowable for recording the moving image whereas not allowable for recording the still image upon movement of the optical transparent member to a predetermined position.

Further, according to the present invention, the foregoing object is also attained by providing a method of designing an optical system, which is attached to an image recording apparatus capable of performing image recording of an optical image of an object passed through an optical transparent member in a first resolution and in a second resolution which is higher than the first resolution, wherein optical property of the optical system is designed allowable for performing the image recording in the first resolution and not allowable for performing the image recording in the second resolution upon movement of the optical transparent member to a predetermined position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 is a flow chart showing a still image sensing process in the fifth embodiment;

FIG. 17 is a block diagram showing an arrangement of an image sensing apparatus according to a sixth embodiment of the present invention; and FIG. 18 is a flow chart showing a still image sensing process in the sixth embodiment.

DETAILED DESCRIPTION OF THE PREFERRED EMBODIMENTS

Preferred embodiments of the present invention will be described in detail in accordance with the accompanying drawings.

First Embodiment

Figure 1:
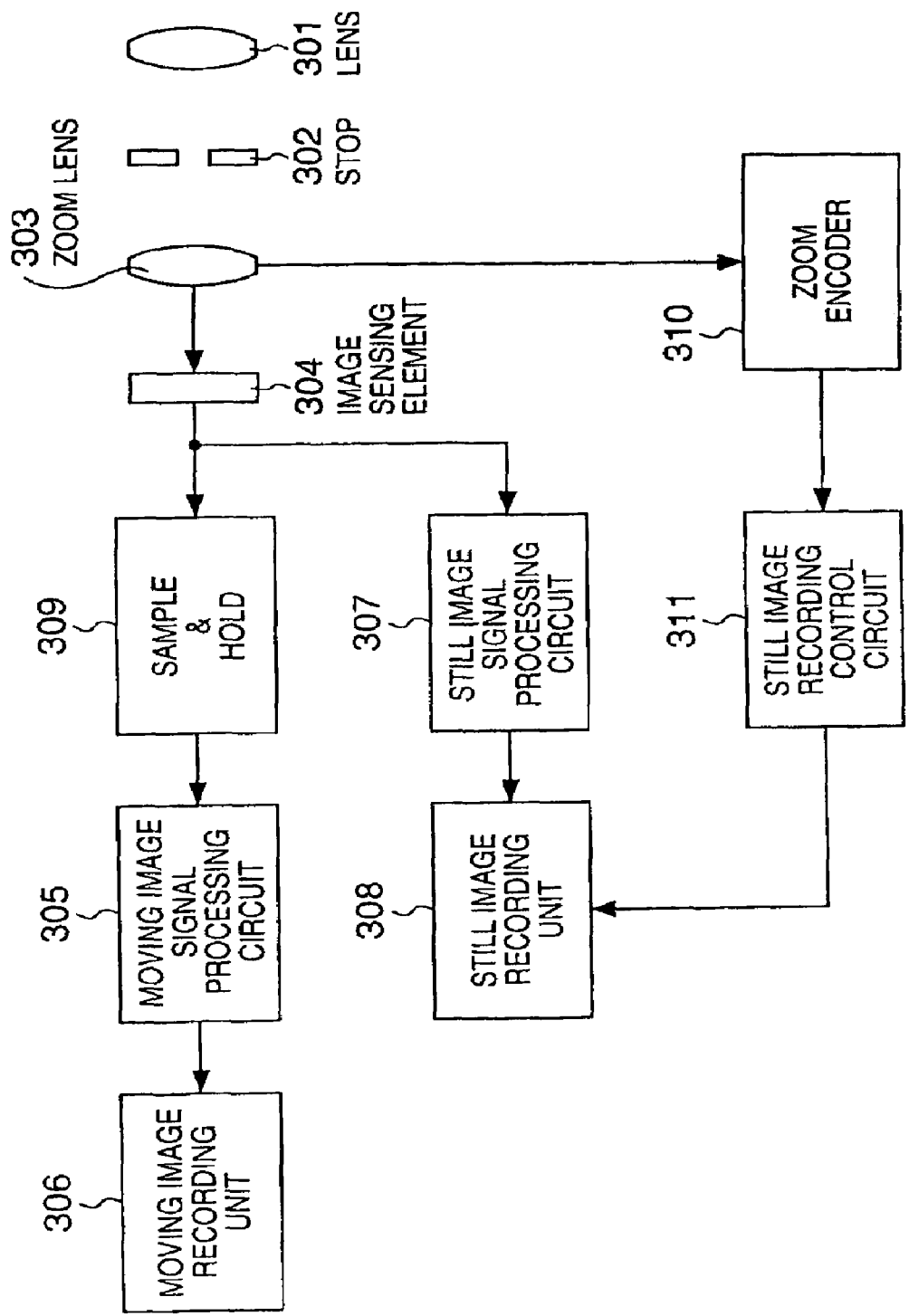
FIG. 1 is a block diagram showing an arrangement of an image sensing apparatus according to a first embodiment of the present invention.

FIG. 1 is a block diagram showing an arrangement of an image sensing apparatus of the first embodiment. In the first embodiment, an image sensing apparatus which integrates a video camera, tape recorder, and memory, and records moving and still images on two different recording media (e.g., a moving image on a tape, and a still image on memory) will be exemplified.

Referring to FIG. 1, reference numeral 301 denotes a lens; 302, a stop; and 304, an image sensing element comprising a photoelectric conversion element such as a CCD. Light that has been transmitted through the lens 301 passes through the stop 302, and forms an object image on the image sensing surface of the image sensing element 304. The image sensing element 304 generates an electrical signal with a charge amount corresponding to the intensity of light formed on the image sensing surface.

Reference numeral 303 denotes a zoom lens, the focal length of which is variable. The focal length of the zoom lens 303 can vary as the position of the zoom lens 303 moves freely in correspondence with the user's setup. Reference numeral 310 denotes a zoom encoder for detecting the position of the zoom lens 303. Based on the detected position of the zoom lens 303, the focal length can be electrically detected.

Reference numeral 305 denotes a moving image signal processing circuit. Reference numeral 306 denotes a moving image recording unit which comprises a VTR or the like and records a moving image on a medium such as a magnetic tape. Reference numeral 309 denotes a sample & hold circuit for selectively holding and continuously reading out some of continuous sensed image signals obtained by the image sensing element 304. Especially, when a multi-pixel CCD is used, the sample & hold circuit 309 selects only electrical signals obtained from a given area (e.g., the central portion of the CCD) corresponding to the information volume required in, e.g., NTSC from those obtained by the image sensing element 304. The moving image signal processing circuit 305 converts the signals selected by the sample & hold circuit 309 into continuous moving images like signals complying with, e.g., NTSC, and records the converted signals in the moving image recording unit 306.

Reference numeral 307 denotes a still image signal processing circuit which comprises a compressed signal processing circuit or the like that adopts an image data format such as JPEG. Reference numeral 308 denotes a still image recording unit such as memory. An electrical signal obtained by the image sensing element 304 is passed to the still image recording unit 308 that records a still image on a medium such as memory via the still image signal processing circuit 307. Furthermore, reference numeral 311 denotes a still image recording control circuit for controlling still image recording. Details of the circuit 311 will be described later.

Note that a timing signal generator (not shown) generates and supplies a reference timing signal to the image sensing element 304, moving image signal processing circuit 305, moving image recording unit 306, still image signal processing circuit 307, and still image recording unit 308 to synchronously operate them.

Since the apparatus has two recording units, i.e., the moving image recording unit 306 and still image recording unit 308, these units can start and end recording of still and moving images at arbitrary timings.

In general, the effective image range of an optical system including a zoom lens becomes narrower with increasing focal length of the zoom lens, or becomes broader with decreasing focal length. In the first embodiment of the present invention, in an optical system including the lens 301, stop 302, zoom lens 303, and the like, the effective image ranges at all focal lengths do not always cover the entire image sensing area of the image sensing element 304, but the optical system is designed so that effective image ranges obtained at focal lengths larger than a given focal length cover the entire image sensing area of the image sensing element 304.

Figure 2:
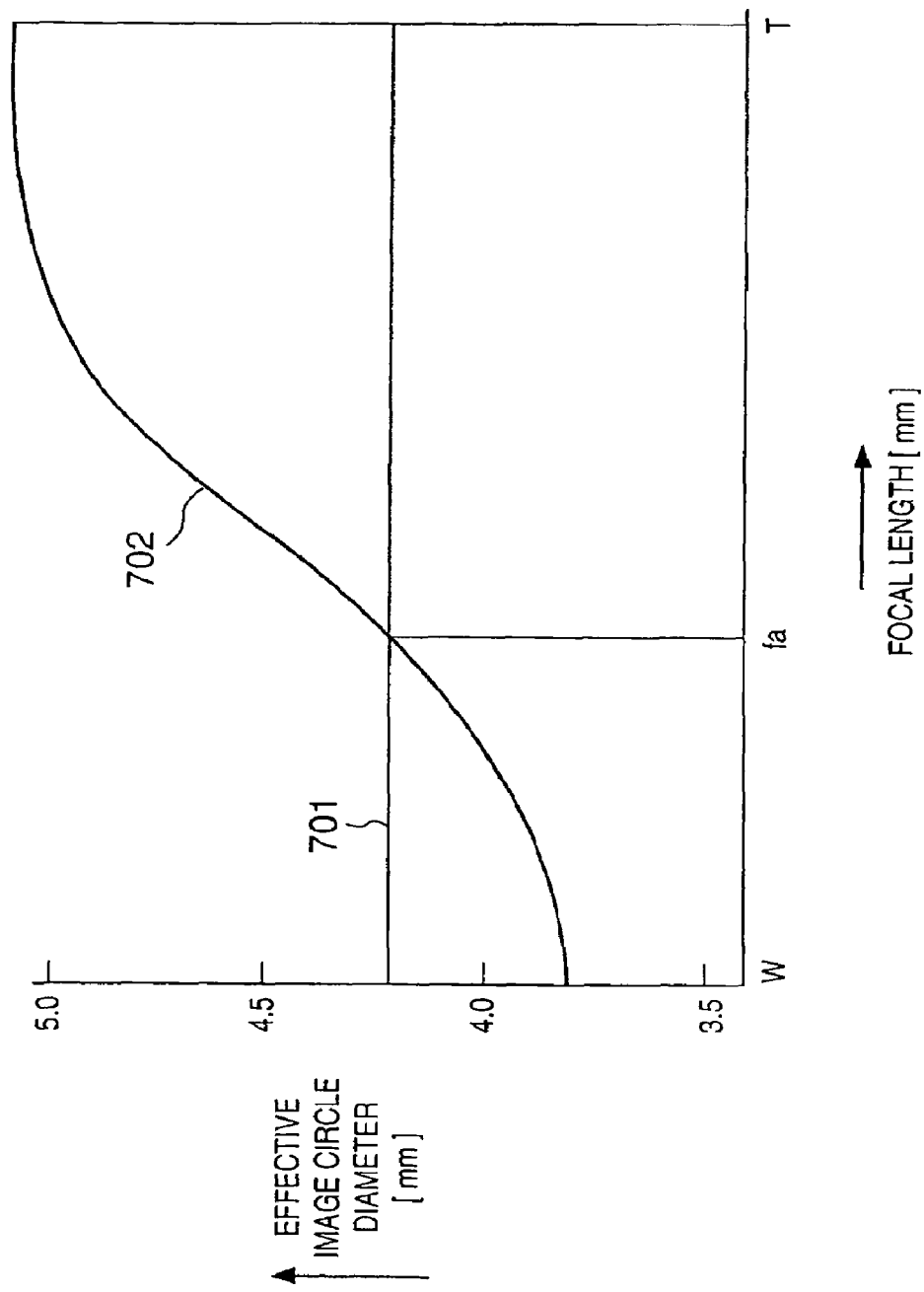
FIG. 2 is a graph showing the relationship between the focal length and effective image circle diameter.

FIG. 2 shows an example of characteristics of a change in effective image range (effective image circle diameter) with respect to the focal length of the zoom lens 303. In FIG. 2, the ordinate plots the effective image circle diameter [mm], and the abscissa plots the focal length [mm] that the zoom lens 303 can be set. Furthermore, reference numeral 701 in FIG. 2 denotes a line indicating the diameter of a circle required to cover all the effective pixels (to be referred to as a "full effective image sensing area" hereinafter) of the image sensing element 304. Also, reference numeral 702 denotes a characteristic curve that indicates a change in effective image circle diameter with respect to the focal length. As indicated by the characteristic curve 702, as the focal length changes from the wide-angle side (W) (i.e., the focal length is short) toward the telephoto side (T) (i.e., the focal length is long), the effective image circle diameter increases, and when the focal length has exceeded a given focal length fa, the effective image circle covers the full effective image sensing area of the image sensing element 304.

Figure 3:
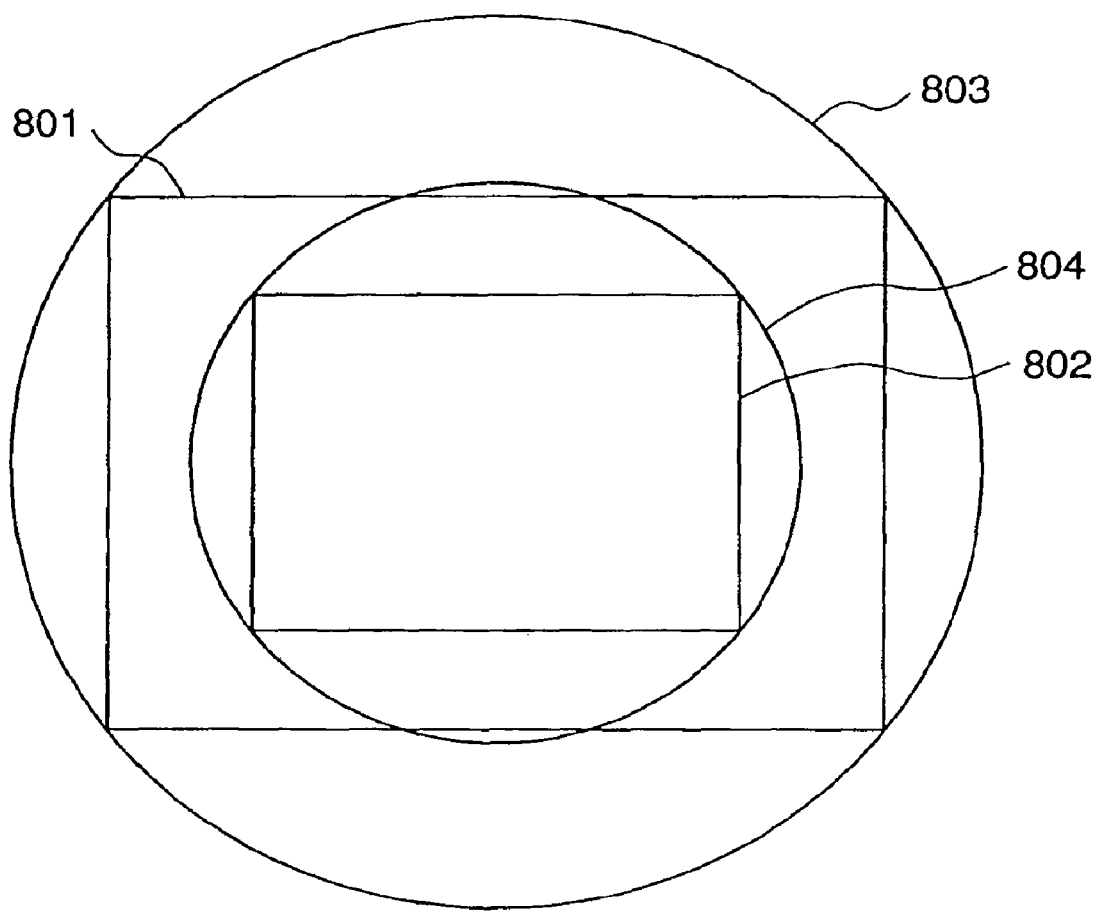
FIG. 3 is a view showing the relationship between effective image circle and image sensing area.

FIG. 3 explains the state shown in FIG. 2 on the image sensing surface. Referring to FIG. 3, reference numeral 801 denotes the full effective image sensing area of the image sensing element 304, i.e., the full area that can photoelectrically convert the object image. Reference numeral 803 denotes the size of the effective image circle that coverts the full effective image sensing area of the image sensing element 304. The focal length at that time corresponds to the point fa in FIG. 2.

When the focal length changes from fa to the wide-angle side, the effective image circle becomes smaller, as described in FIG. 2, and the effective image circle at the wide-angle side has a size 804. The object image that can be sensed in such case is narrowed down to an area 802. Conversely, when the focal length changes from fa to the telephoto side, the size of the effective image circle exceeds that of the effective image circle 803, and the same operation as in the conventional apparatus can be done.

Note that the relationship between the size of the effective image circle and the focal length is contradictory to the size of the lens optical system in optical design, and the following choices may be made. That is, in order to attain a size reduction of the lens optical system, the point indicated by the focal length fa is set at the telephoto side, or in order to make the effective image circle effective over a broad focal length range, the point indicated by the focal length fa is set at the wide-angle side causing an increase in size of the lens optical system.

Referring back to FIG. 1, the still image recording control circuit 311 will be explained below. The circuit 311 checks based on the focal length information obtained by the zoom encoder 310 if the effective image circle diameter at the current focal length set by the user can cover the full effective image sensing area of the image sensing element 304. If the effective image circle can cover the full effective image sensing area, the circuit 311 permits still image sensing; otherwise, it inhibits image sensing. In other words, when the focal length is on the telephoto side of the point fa on the graph shown in FIG. 2, it is determined that the effective image circle covers the full effective image sensing area; when the focal length is on the wide-angle side of the point fa, it is determined that the effective image circle does not cover the full effective image sensing area.

Figure 4:
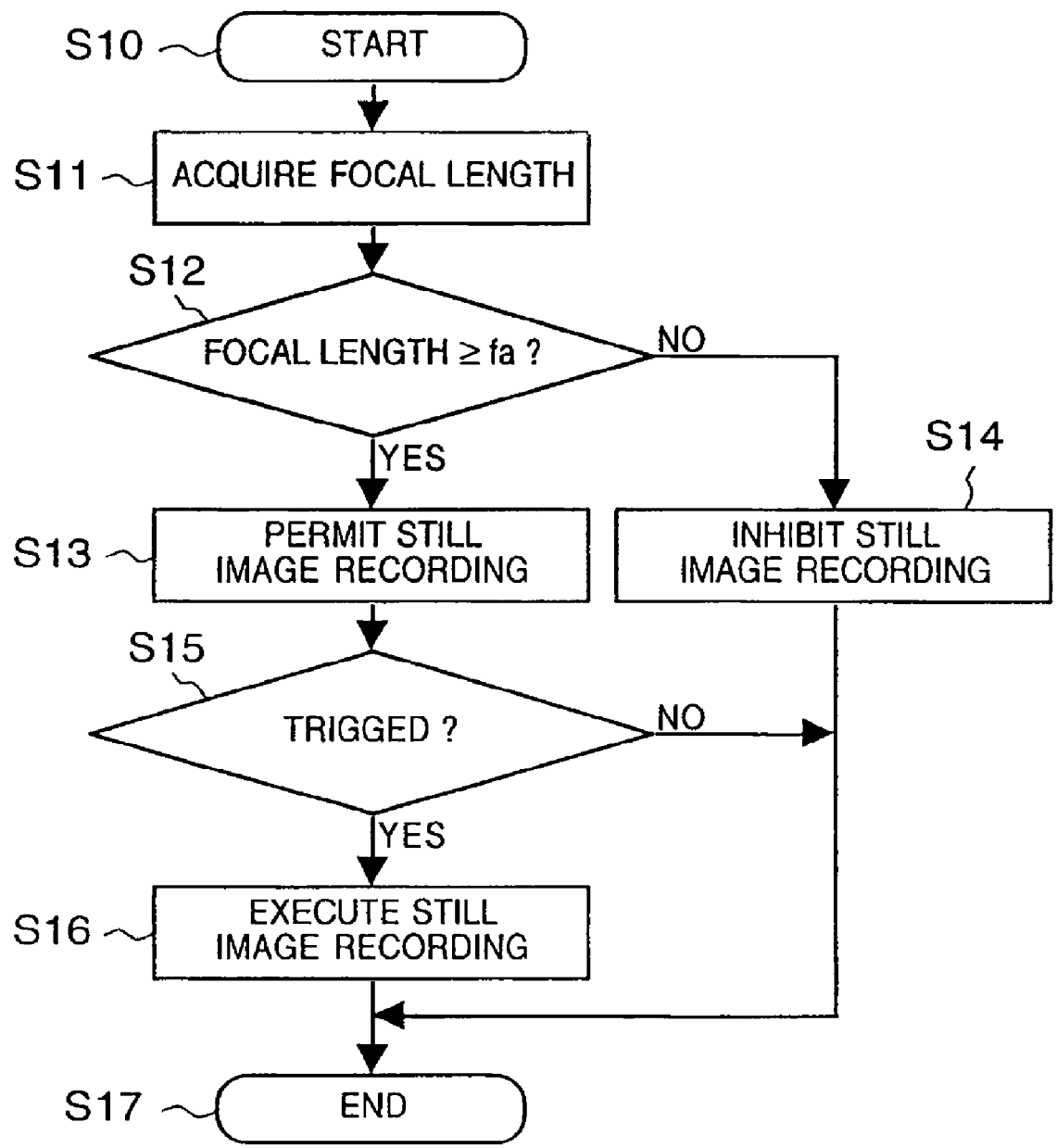
FIG. 4 is a flow chart showing a still image sensing process in the first embodiment.

The operation of the still image recording control circuit 311 will be explained below with reference to the flow chart shown in FIG. 4. This flow chart is executed at, e.g., every read reference timing of the image sensing element 304 (step S10). In step S11, the zoom encoder 310 reads the current position information of the zoom lens 303 and obtains the focal length.

It is checked in step S12 if the current focal length is equal to or larger than the focal length fa, i.e., if the effective image circle covers the full effective image sensing area of the image sensing element 304. If YES in step S12, the flow advances to step S13 to permit still image recording. On the other hand, if NO in step S12, the flow advances to step S14 to inhibit still image recording, and the flow advances to step S17 to end this flow.

If still image recording is permitted in step S13, it is checked in step S15 if the user has pressed a still image recording trigger button (not shown). If YES in step S15, the flow advances to step S16 to capture an image by storing the current image in the still image recording unit 308. On the other hand, if NO in step S15, the flow jumps to step S17 to end this flow.

Note that "still image recording is permitted" in step S13, and "still image recording is inhibited" in step S14, but other operations involved in these operations need not be made. However, when power to the still image recording unit 308 is supplied or stopped in correspondence with permission or inhibition of still image recording, electric power can be efficiently used.

Still image sensing has been explained. In moving image sensing, some of signals obtained from the image sensing element 304 are continuously recorded. As described above, since the number of pixels required for moving image display that complies with the existing scheme such as NTSC or the like is smaller than that required for a still image, the sample & hold circuit 309 temporarily selects and holds only image signals obtained from predetermined pixels of an arbitrary central area of the full effective image sensing area of the image sensing element 304, and the held signals are continuously read out and recorded.

For example, when the moving image sensing area is set to be equal to or smaller than the effective image range at the wide-angle side (area 804 in FIG. 3), since the moving image sensing area can fall within the effective image range irrespective of the focal length, image sensing can be normally done. Conversely, when the optical system is designed so that the moving image sensing area (area 802 in FIG. 3) inscribes the effective image range (area 804 in FIG. 3) at the wide-angle side, the size of the lens optical system can be minimized.

Second Embodiment

In the first embodiment, still image sensing is permitted or inhibited in accordance with the relationship between the focal length and effective image circle. Alternatively, the second embodiment is characterized in that the image range in the still image sensing mode is changed in accordance with the relationship between the focal length and effective image circle.

Figure 5:
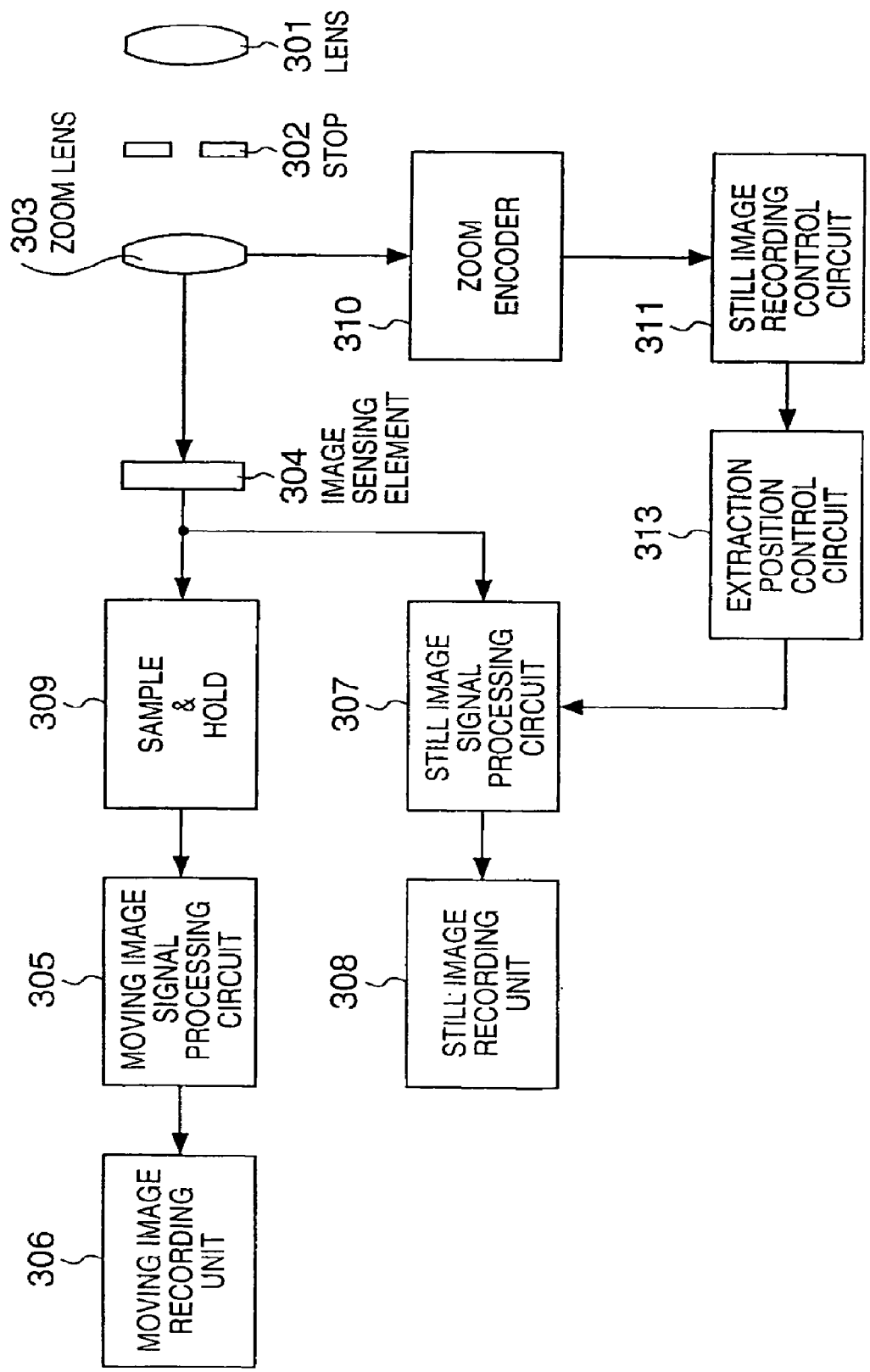
FIG. 5 is a block diagram showing the arrangement of an image sensing apparatus according to a second embodiment of the present invention.

FIG. 5 is a block diagram showing an arrangement of an image sensing apparatus of the second embodiment. In the following description, the same reference numerals denote building components that have already been explained in FIG. 1, and a detailed description thereof will be omitted. The still image recording control circuit 311 checks based on the focal length information obtained by the zoom encoder 310 if the effective image circle diameter at the current focal length set by the user covers the full effective image sensing area of the image sensing element 304, in the same manner as that described in the first embodiment. In the second embodiment, when the effective image circle diameter does not cover the full effective image sensing area, an image range that is to undergo a still image signal process is selected via an extraction position control circuit 313 in place of inhibiting still image sensing, and only a specific image range is extracted as a still image and undergoes a signal process.

Figure 6:
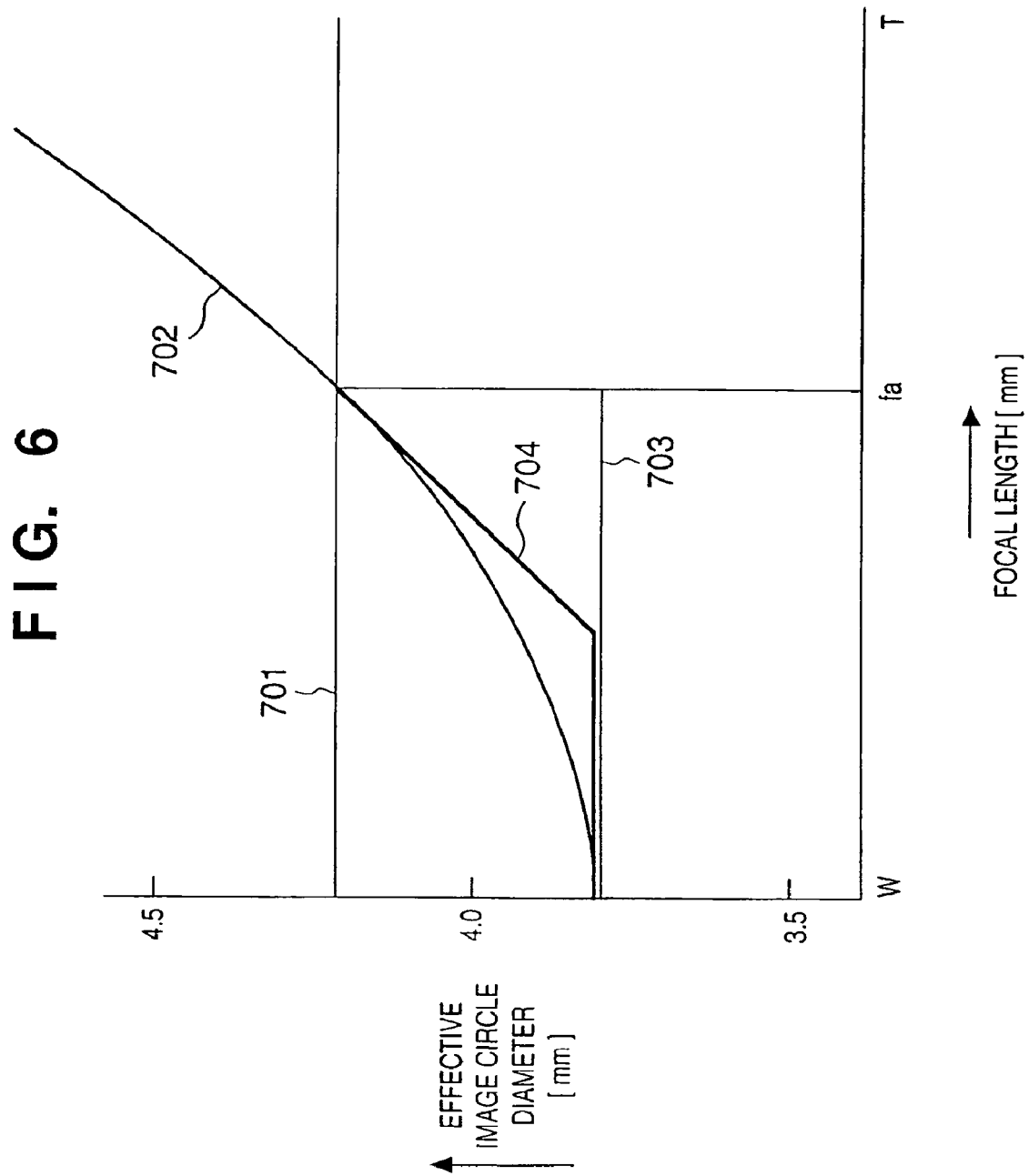
FIG. 6 is a graph showing the relationship between the focal length and effective image circle diameter.

This operation will be described in more detail below using FIG. 6. The graph shown in FIG. 6 shows the relationship between the focal length and effective image circle diameter as in FIG. 2 described in the first embodiment. In this embodiment, a state wherein the focal length is on the wide-angle side of fa, and the effective circle diameter is smaller than that of a circle which covers the full effective image sensing area of the image sensing element 304, i.e., the diameter assumes a value smaller than the value of a line 701 must be noted. In the first embodiment, still image sensing in this state is inhibited. In such state, although image data of the full effective image sensing area cannot be obtained, only an image that can be sensed within the effective image circle with a diameter indicated by a line 703 in FIG. 6 can be captured as a still image.

More specifically, when the focal length becomes smaller than fa, the image sensing area 802 that inscribes the effective image circle on the wide-angle side shown in FIG. 3 is set as a still image sensing area, and that area is extracted. When only this range undergoes a still image signal process, a still image can be sensed although the image area to be sensed becomes small.

Figure 7:
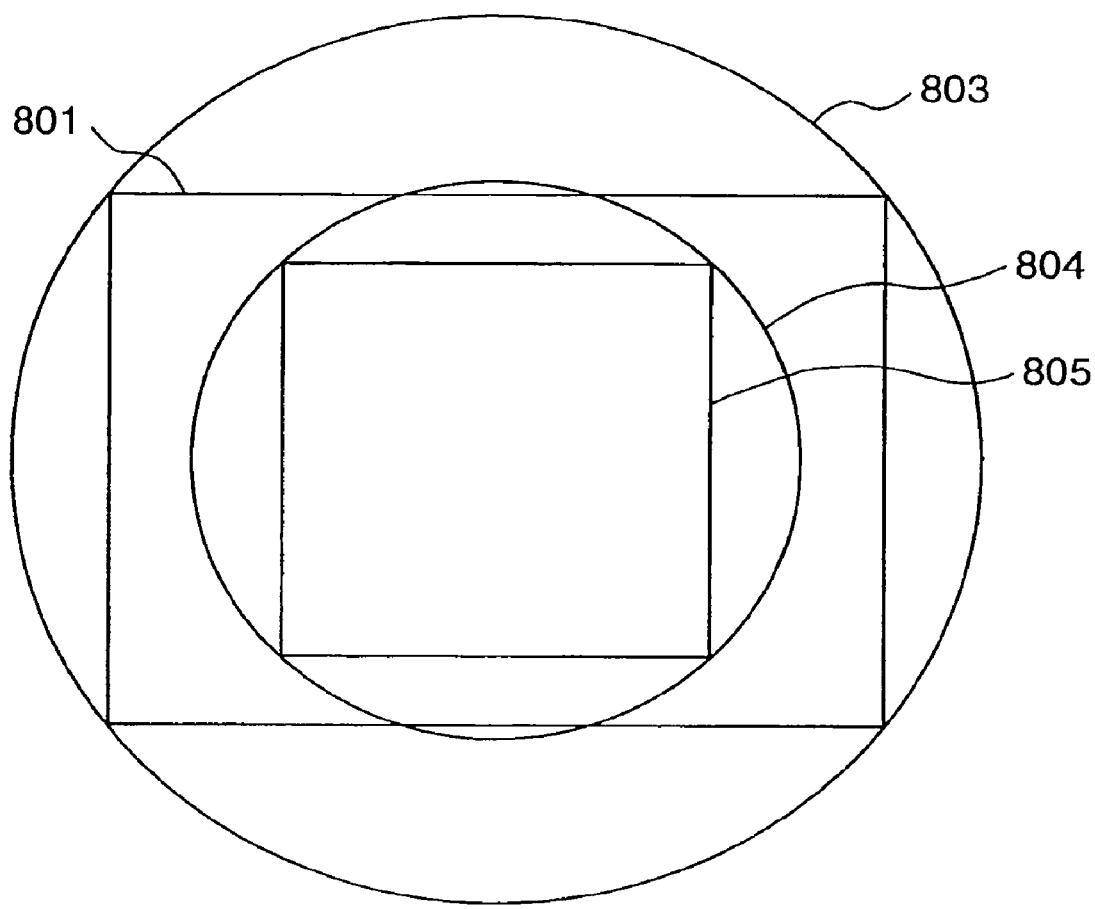
FIG. 7 is a view showing the relationship between the effective image circle and image sensing area.

As indicated by the line 703 in FIG. 6, the still image extraction area may be gradually narrowed down, as indicated by a line 704 in accordance with the focal length in place of being fixed when the focal length is smaller than fa. Further, when the effective image circle diameter becomes smaller than that of the circle circumscribing the full effective image sensing area (i.e., when the focal length is smaller than fa), the aspect ratio of the area where data is read out from the image sensing element 304 as a still image need not always be that of the image sensing element 304. For example, the area to be read out from the image sensing element may have a square shape as indicated by an area 805 in FIG. 7 or even circular shape.

Figure 8:
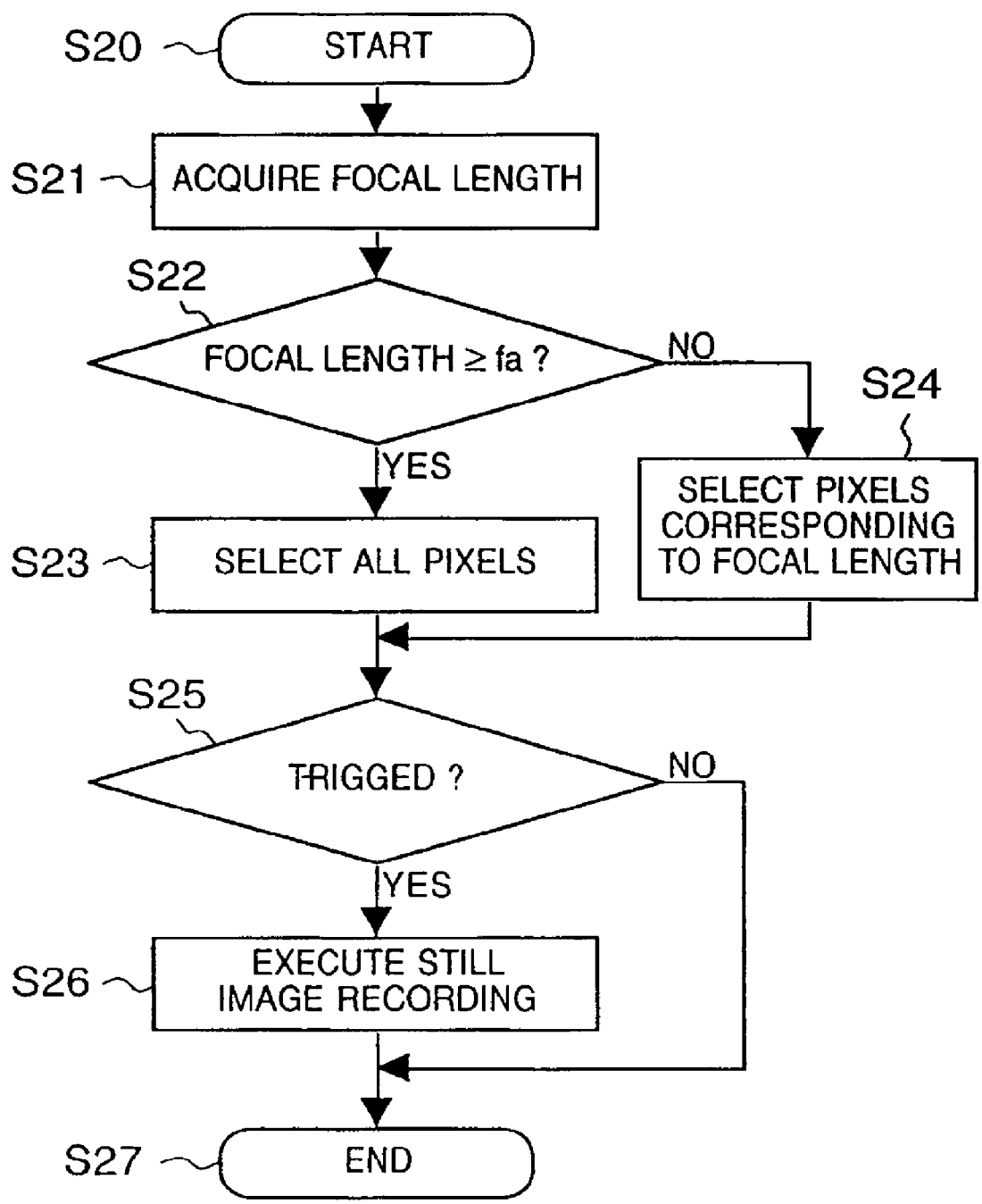
FIG. 8 is a flow chart showing a still image sensing process in the second embodiment.

The operations of the still image recording control circuit 311 and extraction position control circuit 313 will be explained below with reference to the flow chart shown in FIG. 8. This flow chart is executed at, e.g., every read reference timing of the image sensing element 304 (step S20). In step S21, the zoom encoder 310 reads the current position information of the zoom lens 303 and obtains the focal length.

It is checked in step S22 if the current focal length is equal to or larger than the focal length fa, i.e., if the effective image circle covers the full effective image sensing area of the image sensing element 304. If YES in step S22, the flow advances to step S23 to set a still image recording standby state using all pixels. On the other hand, if NO in step S22, the flow advances to step S24 to select pixels corresponding to the current focal length, thus setting a still image recording standby state.

It is checked in step S25 if the user has pressed a still image recording trigger button (not shown). If YES in step S25, the flow advances to step S26 to capture an image by storing the current image in the still image recording unit 308. On the other hand, if NO in step S25, the flow jumps to step S27 to end this flow.

As an operation for "selecting pixels corresponding to the focal length" in step S24, a method of setting a look-up table that outputs the position of a pixel used in image sensing as vertical and horizontal coordinate positions using the focal length as an argument, a method of selecting an area based on a computation result from the central coordinate position of the image sensing element using a pre-set approximate expression that uses the focal length as a variable, or the like may be used. However, the present invention is not limited to these specific methods, and any methods may be used as long as an arbitrary area within the effective image circle can be selected.

The extraction position control circuit 313 informs the still image signal processing circuit 307 of the image sensing area to be used in the still image signal process as the shape, size, distance from the center, and the like (, pre-stored as data,) of a figure to be extracted and reads out pixel signals of only that area, thus obtaining a still image which does not contain any area outside the effective image circle.

Third Embodiment

In the first and second embodiments, still image sensing is inhibited or a pixel signal read area of the still image signal is changed under the condition in which the effective image circle diameter cannot cover the full effective image sensing area of the image sensing element 304. Alternatively, the third embodiment does not limit the read operation itself of an image signal, but informs the user that an image sensing area suffers an optical shadow in the still image sensing mode by producing an alert.

Figure 9:
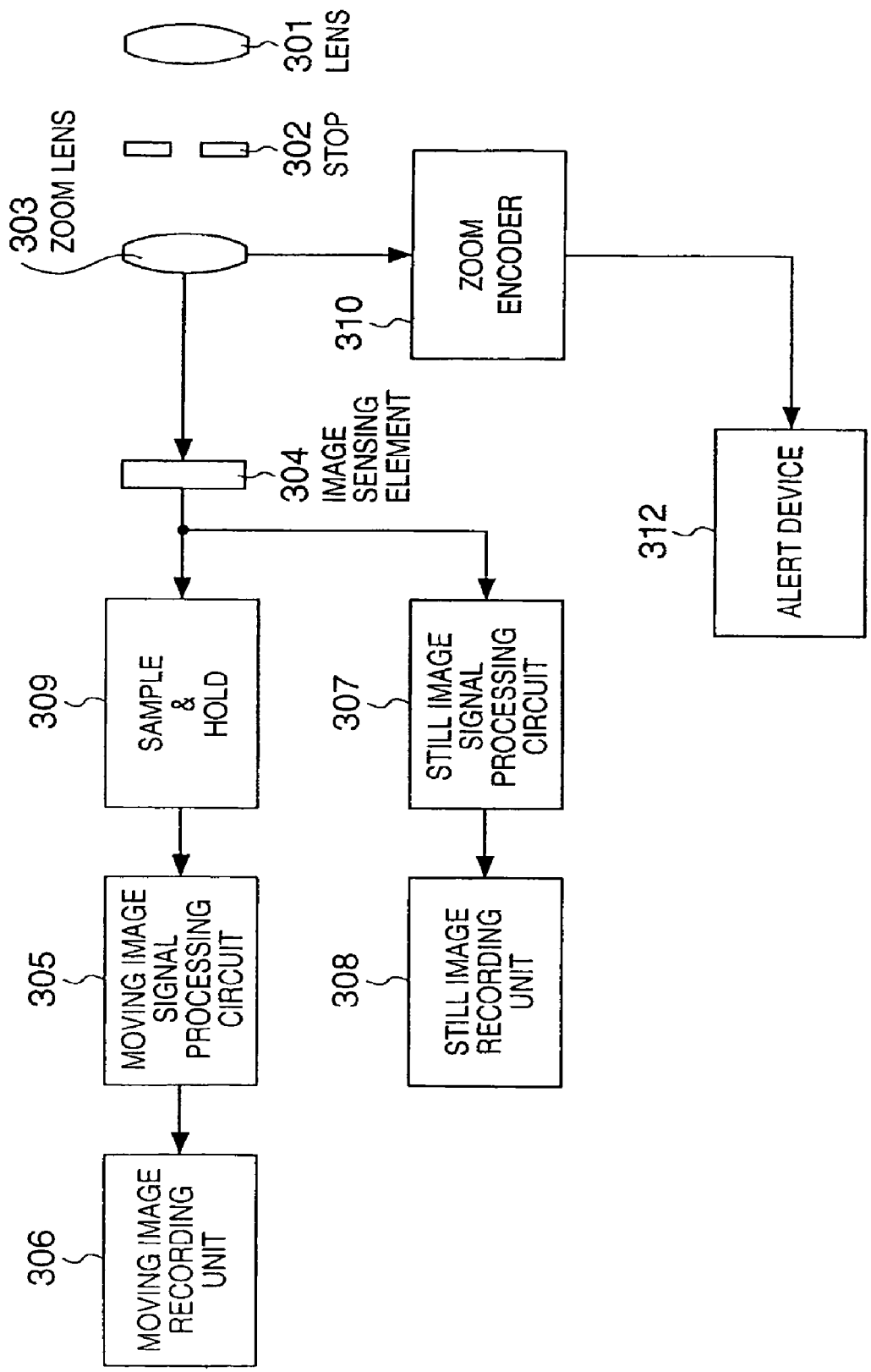
FIG. 9 is a block diagram showing an arrangement of an image sensing apparatus according to a third embodiment of the present invention.

FIG. 9 is a block diagram showing the arrangement of an image sensing apparatus of the third embodiment. In the following description, the same reference numerals denote building components that have already been explained in FIG. 1, and a detailed description thereof will be omitted. Reference numeral 312 denotes an alert device which executes a discrimination process in accordance with the focal length detected by the zoom encoder 310, and produces an alert to the user when an optical shadow is formed in the still image sensing mode. This alert device 312 includes a buzzer that produces alert sound, a lamp that makes alert indication, and means for making given display on an electronic viewfinder which is used to confirm a sensed image.

Figure 10:
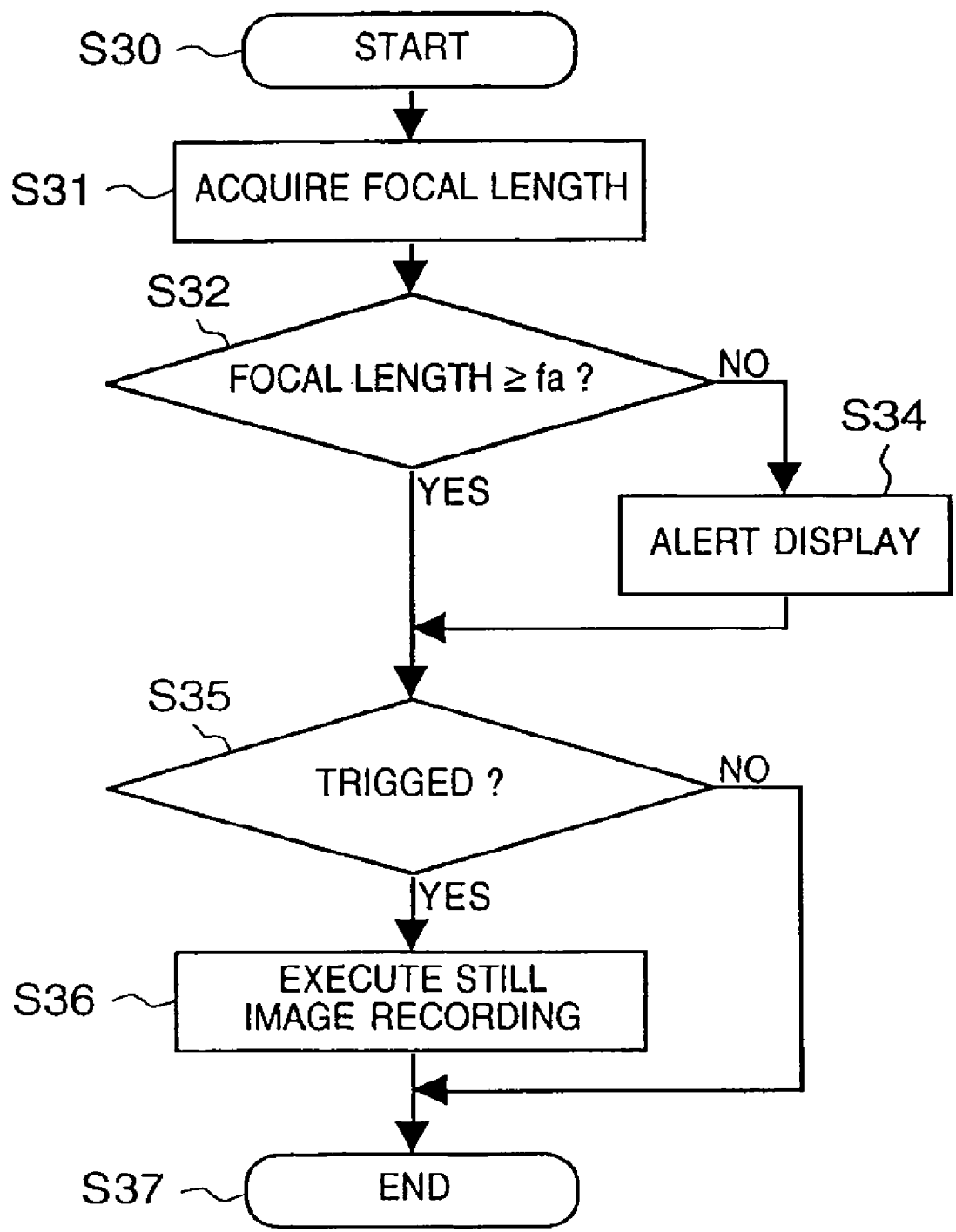
FIG. 10 is a flow chart showing a still image sensing process in the third embodiment.

The operation of the alert device 312 will be explained below with reference to the flow chart shown in FIG. 10. This flow chart is executed at, e.g., every read reference timing of the image sensing element 304 (step S30). In step S31, the zoom encoder 310 reads the current position information of the zoom lens 303 and obtains the focal length.

It is checked in step S32 if the current focal length is equal to or larger than the focal length fa, i.e., if the effective image circle covers the full effective image sensing area of the image sensing element 304. If YES in step S32, the flow directly advances to step S35. On the other hand, if NO in step S32, the flow advances to step S34 to produce an alert indicating that the image sensing circle does not cover the full effective image sensing area of the image sensing element 304 in the still image sensing mode, and the flow then advances to step S35.

It is checked in step S35 if the user has pressed a still image recording trigger button (not shown). If YES in step S35, the flow advances to step S36 to capture an image by storing the current image in the still image recording unit 308. On the other hand, if NO in step S35, the flow jumps to step S37 to end this flow.

Fourth Embodiment

The first to third embodiments have exemplified the apparatus which selects only a local area of the image sensing element 304 by the sample & hold circuit 309 upon moving image recording. Alternatively, the fourth to sixth embodiments to be described later are premised on an apparatus that uses the entire area of the image sensing element 304 upon moving image recording.

Figure 11:
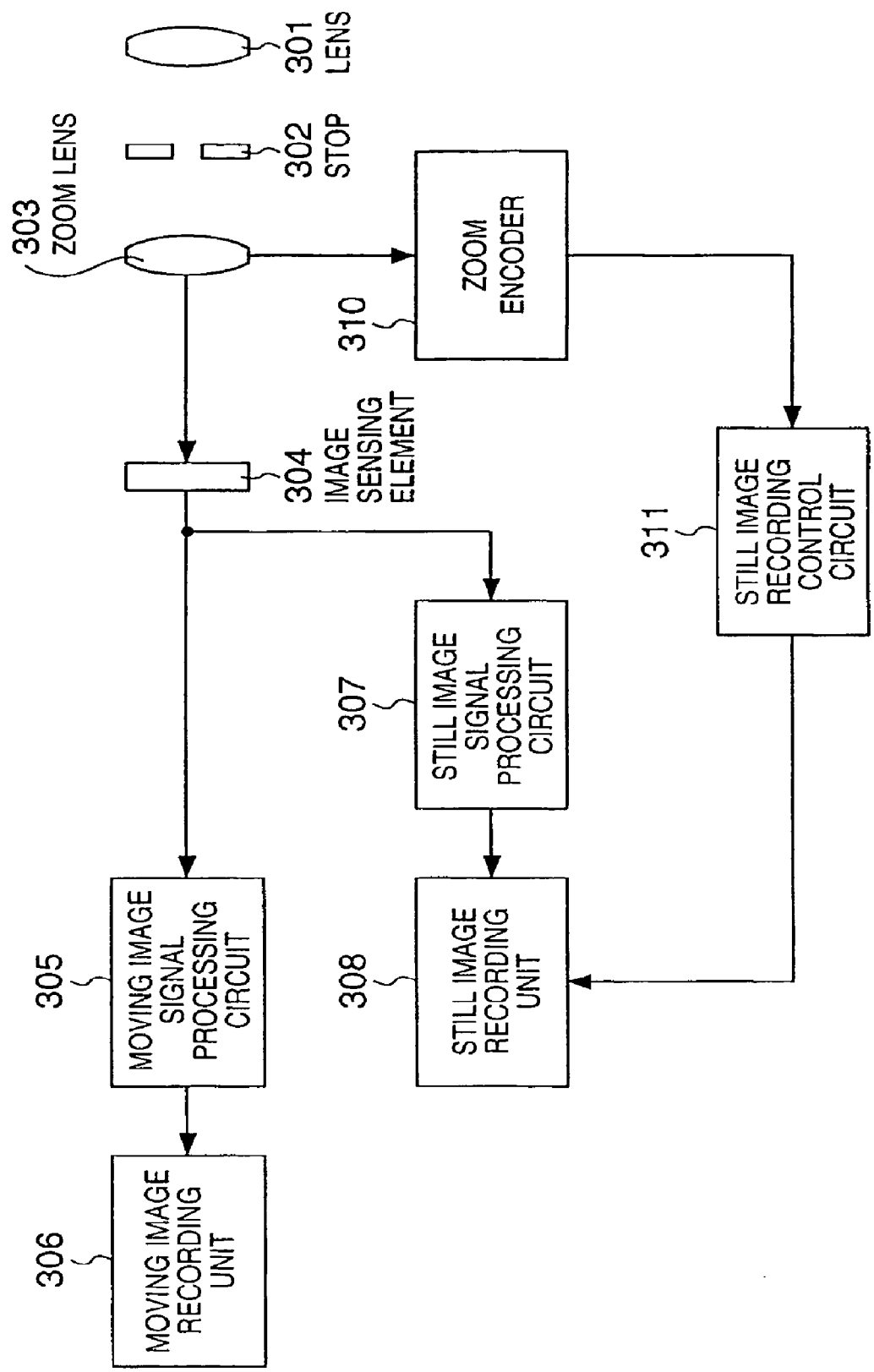
FIG. 11 is a block diagram showing an arrangement of an image sensing apparatus according to a fourth embodiment of the present invention.

FIG. 11 is a block diagram showing the arrangement of an image sensing apparatus of the fourth embodiment. The still image recording control circuit 311 checks based on the focal length information obtained by the zoom encoder 310 if the resolving power corresponding to the current focal length satisfies the required resolving power upon sensing a still image, and inhibits still image recording if it does not satisfy.

In the fourth embodiment, in the optical system including the lens 301, stop 302, and zoom lens 303, the resolutions in the entire focal point do not always assume values that can satisfy the resolution of the image sensing element 304, but the optical system is designed so that only a range obtained at focal lengths shorter than a given focal length can satisfy the resolution of the image sensing element 304, so as to avoid an increase in size of the lens optical system.

Figure 12:
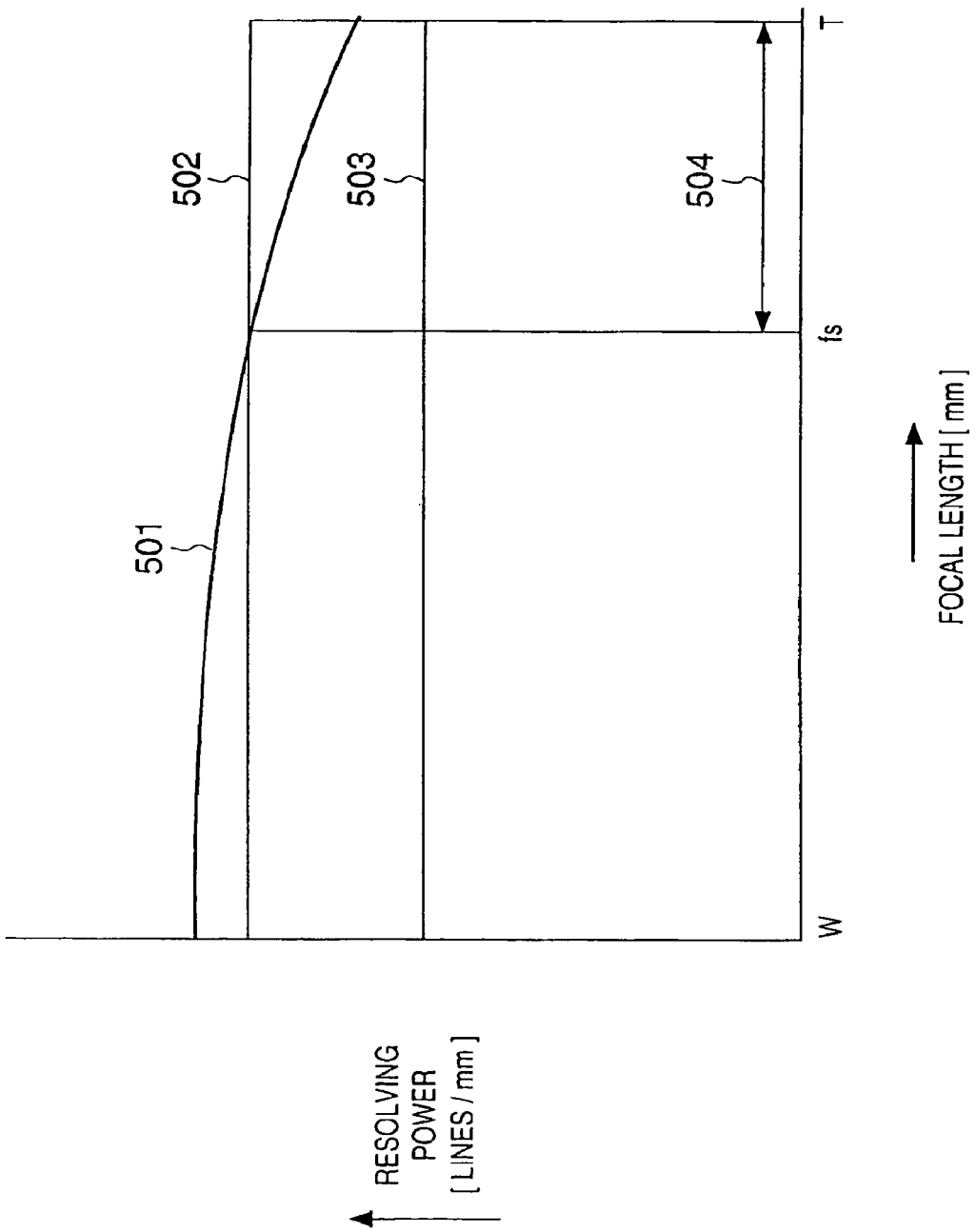
FIG. 12 is a graph showing the relationship between the focal length and resolving power.

The resolving power of the zoom lens 303 corresponding to the multi-pixel image sensing element will be explained below using FIG. 12. FIG. 12 shows a change in resolving power [lines/mm] plotted along the ordinate with respect to the focal length [mm] plotted along the abscissa.

In FIG. 12, reference numeral 501 denotes a characteristic curve that indicates the resolving power of the zoom lens 303 with respect to the focal length. As can be seen from this curve, the resolving power lowers with increasing the focal length. Such resolving power characteristics are determined by balance between the size of the optical system and the resolving power to be obtained at each focal length in optical system design. Designing an optical system with the characteristics shown in the graph in FIG. 12 attaches importance on the resolving power on the wide-angle side (W) at which the focal length is short, and slightly sacrifices that on the telephoto side (T) at which the focal length is large, thus attaining a size reduction of the image sensing optical system.

Reference numeral 502 denotes a line indicating the resolving power required in the still image sensing mode. Upon sensing a still image, a resolving power equal to or higher than a threshold value indicated by the line 502 is required. The resolving power 502 required in the still image sensing mode can be uniquely calculated from the resolution (pixel pitch) of the image sensing element 304.

Reference numeral 503 denotes a line indicating the resolving power required in the moving image sensing mode. Upon sensing a moving image, a resolving power equal to or higher than a threshold value indicated by the line 503 is required. The resolving power 503 required in the moving image sensing mode can be obtained based on the recording resolution of the moving image recording unit 306 or that of the moving image signal processing circuit 305, and a smaller one of these values is sued as the required resolving power 503.

The reason why the required resolving power 502 in the still image sensing mode and the required resolving power 503 in the moving image sensing mode are independently set is that a still image requires a higher resolution of the image sensing element to meet high-image quality needs, but a moving image can only have a resolution as low as that of the conventional apparatus since a display device that can reproduce only a resolution as low as that of the conventional apparatus such as a prevalent monitor that complies with NTSC is used, as described earlier.

As can be seen from the graph shown in FIG. 12, optical characteristics are locally sacrificed by a size reduction of the optical system in optical system design. In a range (still image sensing unsuitable range) 504 where the optical characteristics are sacrificed and which is not suitable for sensing a still image on the telephoto side of a focal length fs, a resolution required in the still image sensing cannot be obtained, but there is no problem to perform moving image sensing that requires only a low resolution.

The still image recording control circuit 311 will be described below. The circuit 311 checks based on the focal length information obtained by the zoom encoder 310 if the resolving power of the zoom lens 303 at the current focal length set by the user has a satisfactory value in still image sensing. If the resolving power has a satisfactory value, the circuit 311 permits still image sensing; otherwise, it inhibits still image sensing. More specifically, when the focal length obtained by the zoom encoder 310 falls within the still image sensing unsuitable range 504, since moving image sensing is possible but a resolution required for still image sensing cannot be obtained, still image sensing is inhibited.

Figure 13:
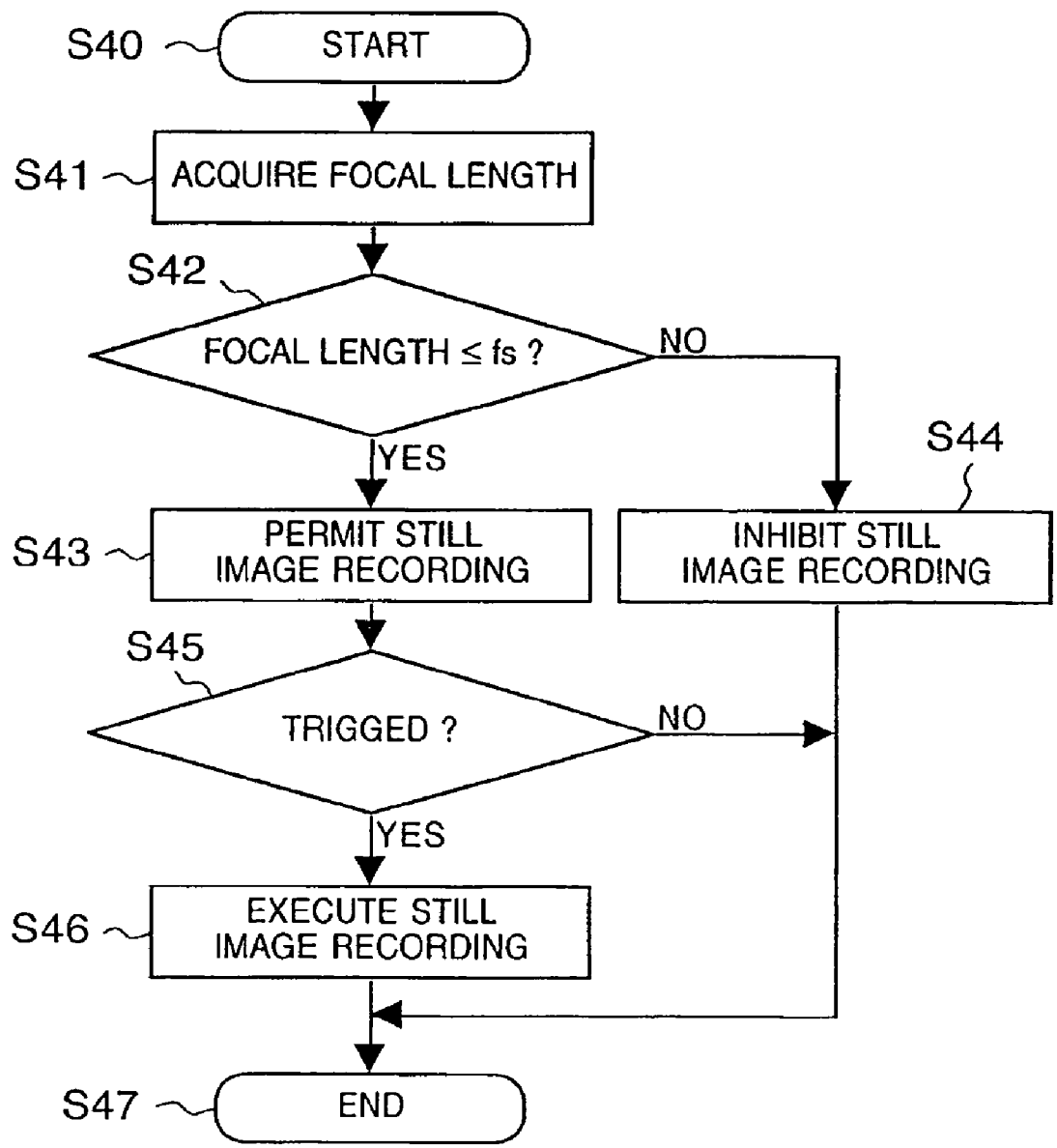
FIG. 13 is a flow chart showing a still image sensing process in the fourth embodiment.

The operation of the still image recording control circuit 311 will be described below with reference to the flow chart shown in FIG. 13. This flow chart is executed at, e.g., every read reference timing of the image sensing element 304 (step S40). In step S41, the zoom encoder 310 reads the current position information of the zoom lens 303 and obtains the focal length.

It is checked in step S42 if the current focal length is equal to or smaller than the focal length fs, i.e., if the resolving power corresponding to the current focal length satisfies the required resolving power in the still image sensing mode. If YES in step S42, the flow advances to step S43 to permit still image recording. On the other hand, if NO in step S42, the flow advances to step S44 to inhibit still image recording, and the flow then advances to step S47 to end this flow.

If still image recording is permitted in step S43, it is checked in step S45 if the user has pressed a still image recording trigger button (not shown). If YES in step S45, the flow advances to step S46 to capture an image by storing the current image in the still image recording unit 308. On the other hand, if NO in step S45, the flow jumps to step S47 to end this flow.

As has been explained in the first embodiment, other special operations need not be made in accordance with the operation for "permitting still image recording" in step S43 or the operation for "inhibiting still image recording" in step S44. However, when power supply to the still image recording unit 308 is supplied or stopped in correspondence with permission or inhibition of still image recording, for instance, electric power can be efficiently used.

The fourth embodiment has exemplified the optical design that sacrifices the resolving power on the telephoto side at which the focal length is large. The resolving power may be sacrificed on the wide-angle side at which the focal length is short or on both the wide-angle and telephoto sides upon designing the optical system, so as to achieve size reduction design of the optical system, and this embodiment is also effective in such case.

Fifth Embodiment

The fourth embodiment adopts the arrangement that pays attention to the relationship between the focal length and optical resolving power. Alternatively, the fifth embodiment pays attention to the relationship between the focal length and optical contrast. Still image sensing may be inhibited as in the fourth embodiment; however, in the following description, a signal process in the still image sensing mode is changed.

Figure 14:
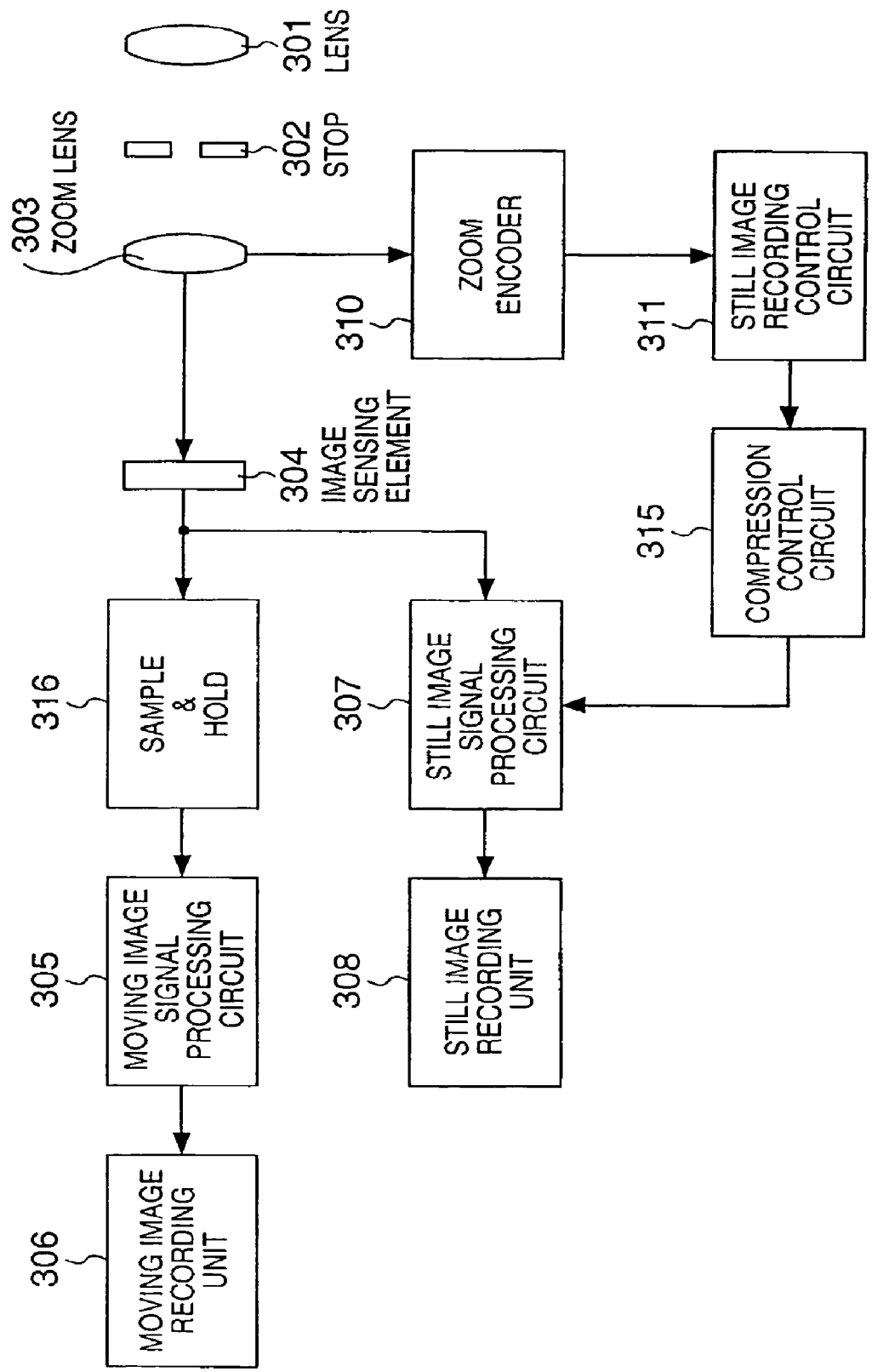
FIG. 14 is a block diagram showing an arrangement of an image sensing apparatus according to a fifth embodiment of the present invention.

FIG. 14 is a block diagram showing an arrangement of an image sensing apparatus of the fifth embodiment. In the fifth embodiment as well, a sample & hold circuit 316 is provided. However, this sample & hold circuit 316 thins out photoelectrically converted signals obtained from the image sensing element 304 to limit signals to those in a predetermined frequency range in place of making area selection unlike the sample & hold circuit 309 described in the first to third embodiments. Note that the sampling timing can be determined by the frequency of the moving image signal processing circuit 305 or moving image recording unit 306.

The still image recording control circuit 311 checks based on the focal length information obtained by the zoom encoder 310 if the contrast at the current focal length set by the user satisfies the resolution of the image sensing element in the still image sensing mode. The circuit 311 controls the compression ratio of a compression process in the still image signal processing circuit 307 via a compression control circuit 315 in accordance with the checking result.

More specifically, if the still image recording control circuit 311 determines that the contrast at the current focal length set by the user does not satisfy the resolution of the image sensing element 304 in the still image sensing mode, the circuit 311 executes one of a control process (1) that sets a high compression ratio of the still image signal processing circuit 307 (sets compression ratio A) to decrease the data size at the cost of reproducibility of an image in the frequency range that cannot be reproduced, and a control process (2) that sets a low compression ratio of the still image signal processing circuit 307 (sets compression ratio B) to reproduce the frequency range that is hard to reproduce even by increasing the data size.

When a high compression ratio is set as in the control process (1), the frequency range that can be reproduced is narrowed down, but the data size can be reduced. Hence, if the frequency range that can be reproduced is narrowed due to a decrease in optical contrast, the storage efficiency of the still image recording unit 308 can be effectively used by executing a signal processing at the high compression ratio.

By contrast, when a low compression ratio is set as in the control process (2), since the frequency range that can be reproduced is broadened, still image recording can be done without deteriorating any more reproducibility in the frequency range in which the optical contrast has been attenuated.

Regarding the compression ratio of the still image signal processing circuit 307 to be controlled by the compression control circuit 315, a high compression ratio can be set by; e.g., computing an orthogonal transform represented by a DCT (discrete cosine transform) or the like, and removing its high-frequency term, and a low compression ratio can be set by keeping the high-frequency term. Note that the present invention is not limited to such specific compression method, and various other known compression methods may be used.

Figure 15:
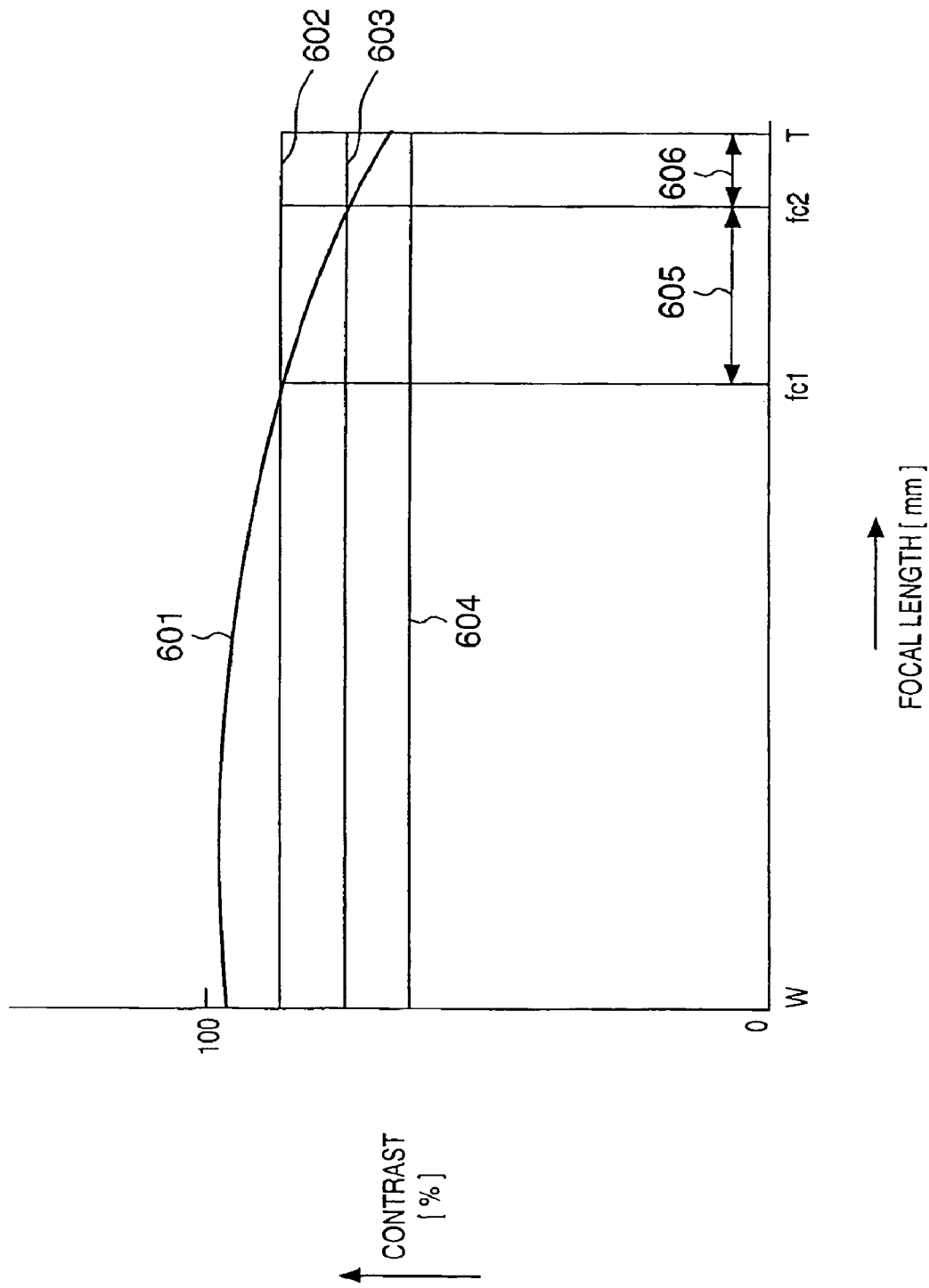
FIG. 15 is a graph showing the relationship between the focal length and contrast.

The contrast of the zoom lens 303 corresponding to the multi-pixel image sensing element will be explained below using FIG. 15. FIG. 15 shows a typical change in contrast of the predetermined resolution at, e.g., the lens central position, and a change in contrast [%] is plotted along the ordinate with respect to the focal length [mm] plotted along the abscissa.

In FIG. 15, reference numeral 601 denotes a characteristic curve indicating a change in contrast with respect to the focal length. As can be seen from the curve 601, the contrast becomes lower with increasing focal length. By slightly sacrificing the contrast, a size reduction of the optical system can be achieved. A decrease in sacrificed contrast is conspicuous especially on the telephoto side at which the focal length is large.

Reference numeral 602 denotes a line indicating the first contrast required in the still image sensing mode. Still image sensing requires the contrast equal to or higher than a threshold value indicated by the line 602. At the contrast equal to or higher than this threshold value, the resolution and element sensitivity of the image sensing element 304 can be satisfactorily reproduced. Reference numeral 603 denotes a line indicating the second contrast at which the process of the still image signal processing circuit 307 is to be changed in the still image sensing mode, and which is used as a reference upon determining a high or low compression ratio in the signal process to be described later.

Reference numeral 604 denotes a line indicating the contrast required in the moving image sensing mode. When a moving image is sensed, a contrast equal to or higher than a threshold value indicated by the line 604 is required.

As can be seen from the graph in FIG. 15, when the size of the optical system is reduced in optical system design, the optical characteristics are locally sacrificed. In a still image sensing focal length range 605 from focal lengths fc1 to fc2, since a contrast required for still image sensing cannot be obtained, the signal process in the still image signal processing circuit 307 is changed to change the compression ratio. Furthermore, in a still image sensing focal length range 606 on the telephoto side of fc2, the compression ratio is further changed.

The operations of the still image recording control circuit 311 and compression control circuit 315 will be described below with reference to the flow chart shown in FIG. 16. This flow chart is executed at, e.g., every read reference timing of the image sensing element 304 (step S50). In step S51, the zoom encoder 310 reads the current position information of the zoom lens 303 and obtains the focal length.

It is checked in step S52 if the current focal length is equal to or smaller than the focal length fc1, i.e., if the contrast corresponding to the current focal length satisfies the first contrast required in the still image sensing mode. If YES in step S52, the flow advances to step S54 to select a normal compression ratio, thus setting a still image recording standby state. On the other hand, if NO in step S52, the flow advances to step S53.

It is checked in step S53 if the current focal length is equal to or smaller than the focal length fc2.

If YES in step S53 (within the still image sensing focal length range 605 between the focal lengths fc1 and fc2 in FIG. 15), compression ratio A is selected, and the still image recording standby state is set (step S55). That is, as in the control process (1) described above, a high compression ratio of the still image signal processing circuit 307 is set, and the data size is reduced by sacrificing the reproducibility of the frequency range that cannot be reproduced, thus effectively using the storage of the still image recording unit 308.

On the other hand, if NO in step S53 (the still image sensing focal length range 606 on the telephoto side of the focal length fc2 in FIG. 15), compression ratio B is selected, and the still image recording standby state is set (step S56). That is, as in the control process (2) described above, a low compression ratio of the still image signal processing circuit 307 is set to reproduce the frequency range that is hard to reproduce even by increasing the data size, thus recording an image without deteriorating any more reproducibility in the frequency range in which the optical contrast has been attenuated.

It is checked in step S57 if the user has pressed a still image recording trigger button (not shown). If YES in step S57, the flow advances to step S58 to capture an image by storing the current image in the still image recording unit 308. On the other hand, if NO in step S57, the flow jumps to step S59 to end this flow.

In the fifth embodiment, the focal length range is divided into three ranges, i.e., the still image sensing focal length ranges 605 and 606, and the remaining focal length range as shown in FIG. 15, and signal processes are done at different compression ratios. Alternatively, the compression ratio may be continuously changed as the focal length changes.

Sixth Embodiment

In the fourth and fifth embodiments, the relationship between the focal length and optical resolving power and between the focal length and contrast have been explained. As another factor that influences the characteristics of an optical system, aberration is known. As for aberration, deterioration of its characteristics tends to be emphasized with increasing focal length as in the contrast explained with reference to FIG. 15. Therefore, a reference focal length fr is set for aberration, and discrimination and process are done based on this focal length fr. When the focal length fr is exceeded, still image recording may be inhibited, as described in the first embodiment, or the still image signal process may be changed (e.g., the compression ratio may be changed), as described in the fifth embodiment. In the sixth embodiment, an alert is produced.

FIG. 17 is a block diagram showing the arrangement of an image sensing apparatus of the sixth embodiment. In the following description, the same reference numerals denote building components that have already been explained in FIG. 1, and a detailed description thereof will be omitted. An alert device 312 executes a discrimination process in accordance with the focal length detected by the zoom encoder 310, and produces an alert to the user when optical deterioration will take place in the still image sensing mode. This alert device 312 includes a buzzer that produces alert sound, a lamp that makes alert indication, and means for making given display on an electronic viewfinder which is used to confirm a sensed image.

The operation of the alert device 312 will be explained below with reference to the flow chart shown in FIG. 18. This flow chart is executed at, e.g., every read reference timing of the image sensing element 304 (step S60). In step S61, the zoom encoder 310 reads the current position information of the zoom lens 303 and obtains the focal length.

It is checked in step S62 if the current focal length is equal to or smaller than the focal length fr, i.e., if the aberration corresponding to the focal length satisfies the level required in the still image sensing mode. If YES in step S62, the flow directly advances to step S64. On the other hand, if NO in step S62, the flow advances to step S63 to produce an alert indicating that the aberration does not satisfy an allowable level in the still image sensing mode, and the flow then advances to step S64.

It is checked in step S64 if the user has pressed a still image recording trigger button (not shown). If YES in step S64, the flow advances to step S65 to capture an image by storing the current image in the still image recording unit 308. On the other hand, if NO in step S64, the flow jumps to step S65 to end this flow.

In the first to sixth embodiments, the still image control circuit 311, extraction position control circuit 313, a discrimination processor of the alert device 312, and compression control circuit 315, may be implemented by, e.g., a microcomputer to execute the flow charts explained in the respective embodiments.

It should be noted that, in the above embodiments, still image recording is inhibited when the focal length is changed across a predetermined focal length; however, the present invention is not limited to this, and the still image recording may not be completely inhibited and merely limited by, e.g., releasing the inhibition of still image recording by a release member. Further, instead of inhibiting and limiting the still image recording, the position of a zoom lens may be inhibited or limited so that the focal length does not become the predetermined focal length upon still image recording.

Further, the limitation of the still image recording is due to deterioration of resolution corresponding to the focal length in the above embodiments; however, the present invention is also applicable to cases in which an image is deteriorated due to movement of an optical transparent member which passes an optical image of an object, such as deterioration of an image due to the focus position and a filter.

Furthermore, both of the moving image and still image are recorded on a recording medium according to the above embodiments, however, one or both of these images may be only displayed or outputted to another apparatus and not recorded on a recording medium.

Further, control processes are changed between a moving image and a still image; however, the present invention is not limited to the moving image and still image, and is applicable to a case of obtaining an image having a first resolution and an image having a second resolution which is higher than the first resolution using, e.g., a multi-pixel image sensing element. In this case, the image of the first resolution corresponds to the moving image of the above embodiments, and the image of the second resolution corresponds to a still image of the above embodiments.

Other Embodiment

The present invention can be applied to a system constituted by a plurality of devices (e.g., host computer, interface, camera head) or to an apparatus comprising a single device (e.g., digital movie camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Further, software configuration and hardware configuration disclosed in the above embodiments may be exchanged.

It should be noted that the present invention includes combinations of the aforesaid embodiments or technical elements disclosed therein.

Further, the present invention is applicable to: various types of cameras, such as a camera using a silver-halide film, a lens-exchangeable camera, a single-lens reflex camera, a leaf shutter camera, and a monitor camera; an image sensing apparatus other than cameras; an image reading apparatus; an optical apparatus; and the like; an apparatus applied to cameras, an image sensing apparatus, an image reading apparatus, an optical apparatus, and the like; elements forming the foregoing apparatuses; control method of the foregoing apparatuses; and a computer program product for providing the control method.

The present invention is not limited to the above embodiments and various changes and modifications can be made within the spirit and scope of the present invention. Therefore to apprise the public of the scope of the present invention, the following claims are made.

What is claimed:

1. An image sensing apparatus comprising:
   (A) an image sensing element that converts an optical image of an object passed through an optical transparent member, capable of changing a focal length, to an image signal; and
   (B) an image processing device that performs first signal processing for obtaining an image signal of a first resolution from the image signal converted by said image sensing element and second signal processing for obtaining an image signal of a second resolution which is higher than the first resolution from the image signal, and that compresses the obtained image signal of the second resolution,
   wherein, when said second signal processing is to be executed, said signal processing device applies predetermined limitation on the basis of optical contrast which changes with respect to the focal length of said optical transparent member at a position to which said optical transparent member is moved, said predetermined limitation being not applied when said first signal processing is to be executed, the predetermined limitation including one of using a compression ratio which is predetermined for the optical contrast and prohibiting the second signal processing, and performed when the optical contrast is lower than a predetermined optical contrast.

2. The image sensing apparatus according to claim 1, wherein said signal processing device applies predetermined limitation when said second signal processing is to be executed and when the focal length is longer than a predetermined length corresponds to the predetermined contrast which denotes a minimum optical contrast required to satisfactorily reproduce the resolution of the image sensing element of said image sensing apparatus, said predetermined limitation being not applied when said first signal processing is to be executed.

3. The image sensing apparatus according to claim 2, wherein said first processing is for a moving image, and said second signal processing is for a still image.

4. The image sensing apparatus according to claim 1, wherein and said predetermined limitation is to set an upper limit of the compression ratio on the basis of the focal length.

5. The image sensing apparatus according to claim 4, wherein said first processing is for a moving image, and said second signal processing is for a still image.

6. A control method of an image sensing apparatus comprising the steps of:
   converting an optical image of an object passed through an optical transparent member, capable of changing a focal length, to an image signal;
   performing first signal processing for obtaining an image signal of a first resolution from the image signal converted by said image sensing element or second signal processing for obtaining an image signal of a second resolution which is higher than the first resolution from the image signal; and
   compressing the image signal of the second resolution,
   wherein, when said second signal processing is to be executed, predetermined limitation is applied on the basis of optical contrast which changes with respect to the focal length of said optical transparent member at a position to which said optical transparent member is moved, said predetermined limitation being not applied when said first signal processing is to be executed, the predetermined limitation including one of using a compression ratio which is predetermined for the optical contrast and prohibiting the second signal processing, and performed when the optical contrast is lower than a predetermined optical contrast.

7. The image sensing apparatus according to claim 1, wherein, when said second signal processing is to be executed, said signal processing device applies a first compression ratio if the optical contrast is in between the first optical contrast which is the predetermined optical contrast and a second optical contrast which is lower than the first optical contrast, and applies a second compression ratio which is lower than the first compression ratio if the optical contrast is lower than the second optical contrast.

8. The image sensing apparatus according to claim 7, wherein the compression ratio continuously changes in accordance with the optical contrast if the optical contrast is lower than the first optical contrast.

* * * * *